(12) United States Patent
Hotta

(10) Patent No.: US 11,346,727 B2
(45) Date of Patent: May 31, 2022

(54) SENSOR, ELECTRONIC DEVICE, WEARABLE TERMINAL, AND CONTROL METHOD

(71) Applicant: SONY CORPORATION, Tokyo (JP)

(72) Inventor: Shin Hotta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 465 days.

(21) Appl. No.: 16/330,892

(22) PCT Filed: Jul. 19, 2017

(86) PCT No.: PCT/JP2017/026019
§ 371 (c)(1),
(2) Date: Mar. 6, 2019

(87) PCT Pub. No.: WO2018/061416
PCT Pub. Date: Apr. 5, 2018

(65) Prior Publication Data
US 2021/0285831 A1    Sep. 16, 2021

(30) Foreign Application Priority Data

Sep. 27, 2016 (JP) .............................. JP2016-188391

(51) Int. Cl.
*G01L 1/14*  (2006.01)
*G01L 5/165*  (2020.01)

(52) U.S. Cl.
CPC .................................. *G01L 1/146* (2013.01)

(58) Field of Classification Search
CPC .......... G11B 5/3903; G11B 2005/0005; G11B 2005/0021; G11B 5/314; G11B 5/39; B82Y 25/00; B82Y 40/00; G11C 11/15; H01F 10/3024; H01F 10/3254; H01F 41/303; H01F 10/3295
See application file for complete search history.

(56) References Cited

U.S. PATENT DOCUMENTS

| 2004/0055396 | A1  | 3/2004  | Morimoto |
| 2007/0227267 | A1* | 10/2007 | Loeb ...................... B25J 13/084 |
|              |     |         |          73/862.046 |
| 2012/0268386 | A1  | 10/2012 | Karamath et al. |
| 2014/0238174 | A1  | 8/2014  | Ikebe |

(Continued)

FOREIGN PATENT DOCUMENTS

| CN | 102750030 A | 10/2012 |
| GB | 2521975 A   | 7/2015  |

(Continued)

OTHER PUBLICATIONS

International Search Report and Written Opinion of PCT Application No. PCT/JP2017/026019, dated Oct. 17, 2017, 08 pages of ISRWO.

(Continued)

*Primary Examiner* — Brandi N Hopkins
(74) *Attorney, Agent, or Firm* — Chip Law Group

(57) ABSTRACT

Provided is a sensor that includes a sensing layer including a pressure detection unit, a dielectric layer provided on the sensing layer, the dielectric layer being deformable, and a conductive layer including a protrusion protruding toward the dielectric layer. The conductive layer is movable in an in-plane direction of the sensing layer.

20 Claims, 24 Drawing Sheets

(56) References Cited

U.S. PATENT DOCUMENTS

2015/0277626 A1* 10/2015 Shinkai ................ G06F 3/0446
                                                           345/174
2016/0015311 A1   1/2016 Jiang
2016/0168064 A1   6/2016 Gilmore et al.

FOREIGN PATENT DOCUMENTS

| | | |
|---|---|---|
| JP | 2004-117042 A | 4/2004 |
| JP | 2006-250705 A | 9/2006 |
| JP | 2012-168064 A | 9/2012 |
| JP | 2012-226743 A | 11/2012 |
| JP | 2013-101062 A | 5/2013 |
| JP | 2012-168064 A | 9/2013 |
| JP | 2014-163815 A | 9/2014 |
| WO | 2014/068269 A1 | 5/2014 |

OTHER PUBLICATIONS

Office Action for JP Patent Application No. 2018-541939, dated Aug. 3, 2021, 3 pages of Office Action and 4 pages of English Translation.

* cited by examiner

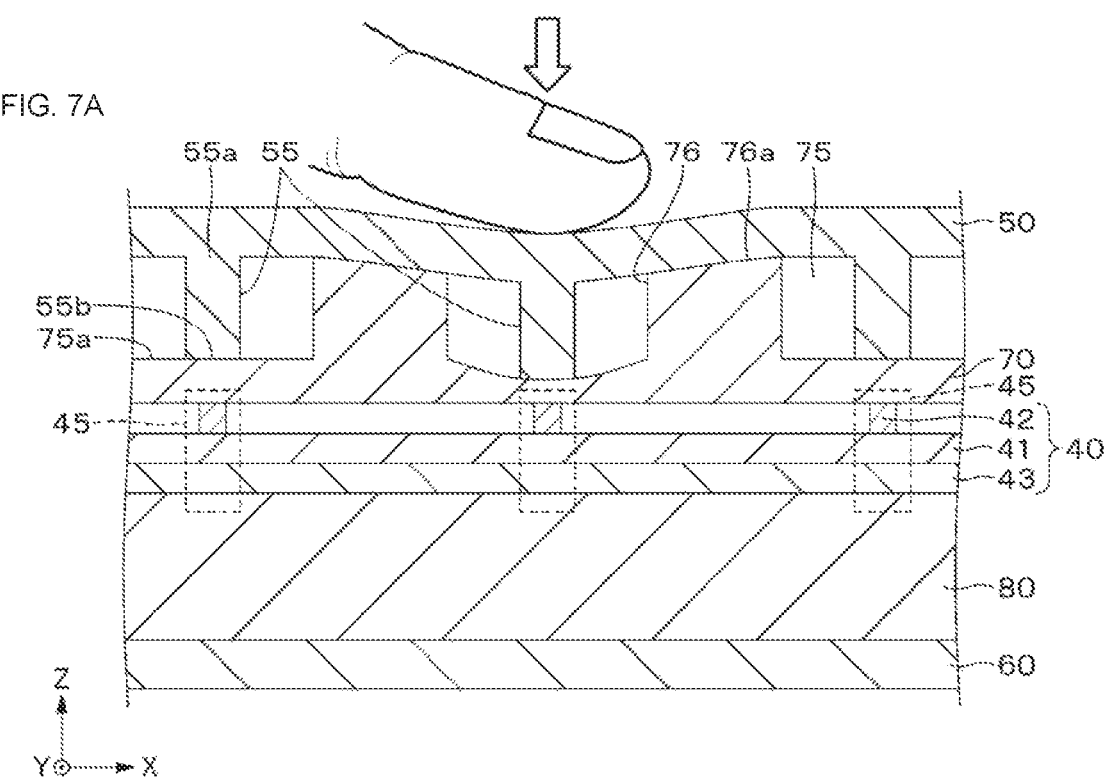
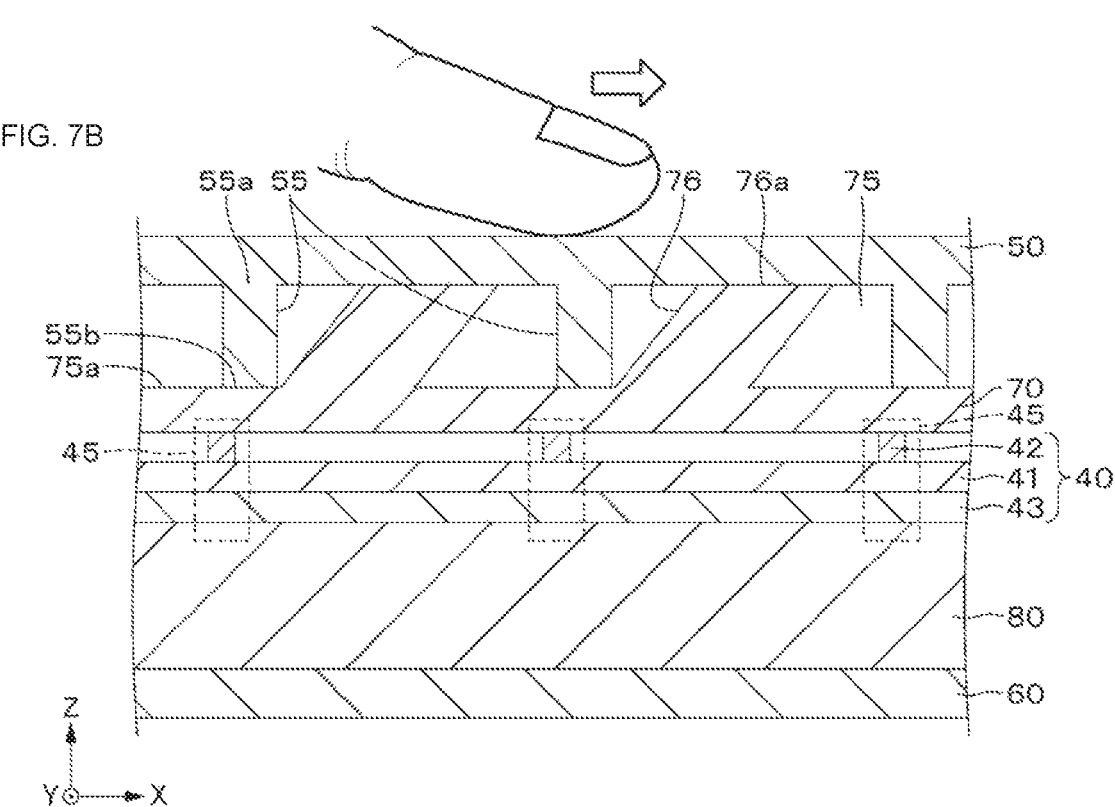

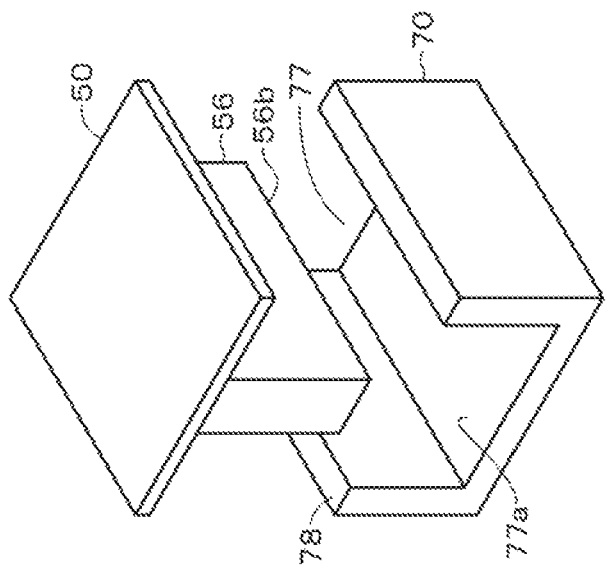
FIG. 10C
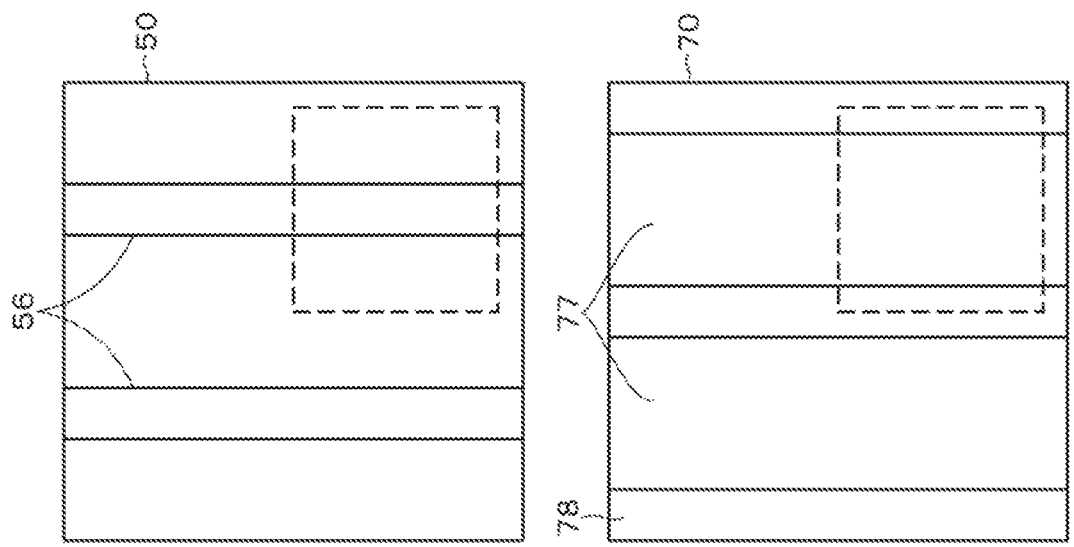
FIG. 10A
FIG. 10B

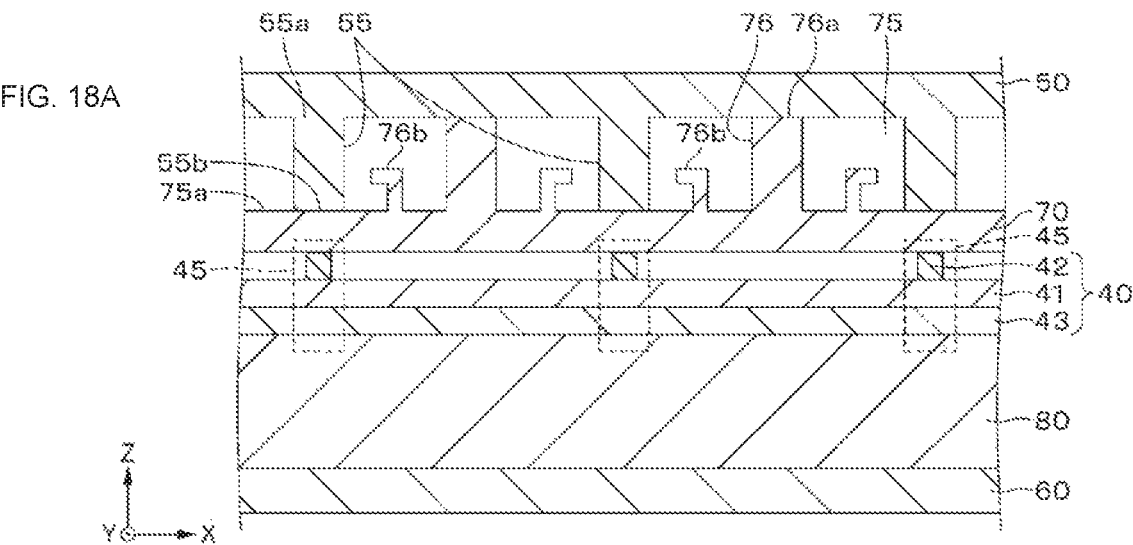
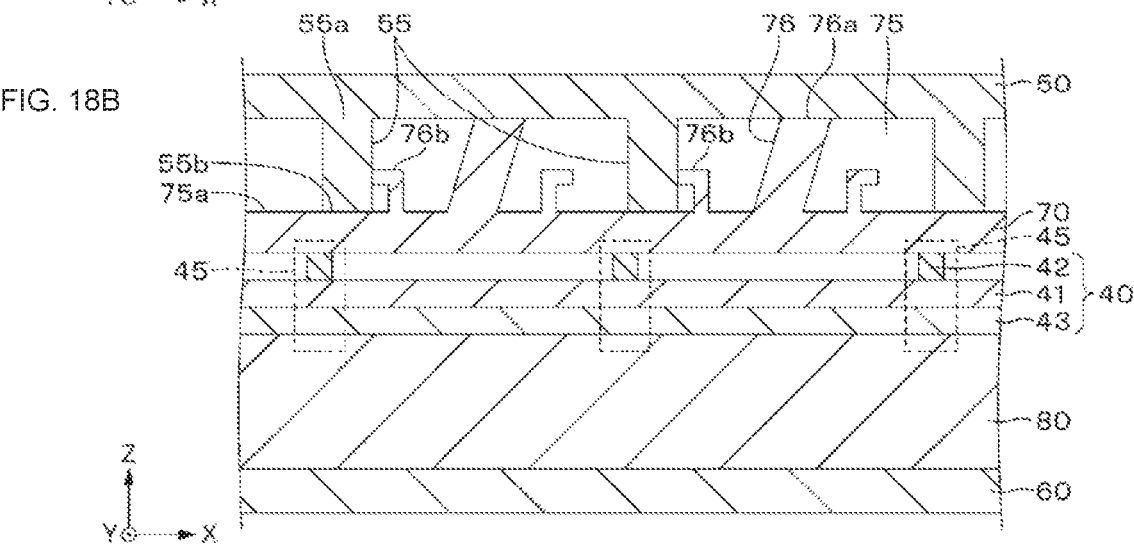
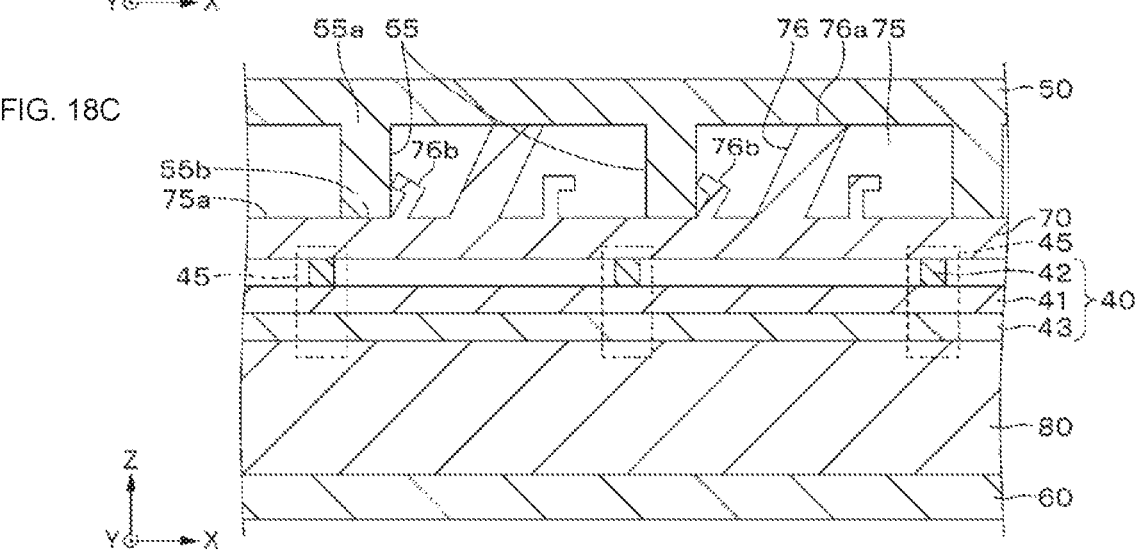

SENSOR, ELECTRONIC DEVICE, WEARABLE TERMINAL, AND CONTROL METHOD

CROSS REFERENCE TO RELATED APPLICATIONS

This application is a U.S. National Phase of International Patent Application No. PCT/JP2017/026019 filed on Jul. 19, 2017, which claims priority benefit of Japanese Patent Application No. JP 2016-188391 filed in the Japan Patent Office on Sep. 27, 2016. Each of the above-referenced applications is hereby incorporated herein by reference in its entirety.

TECHNICAL FIELD

The present technology relates to a sensor, an electronic device, a wearable terminal, and a control method.

BACKGROUND ART

A sensor has been devised capable of detecting not only pressing force on an input operation surface but also shearing force (see, for example, Patent Documents 1 to 3 below).

CITATION LIST

Patent Document

Patent Document 1: Japanese Patent Application Laid-Open No. 2012-168064
Patent Document 2: Japanese Patent Application Laid-Open No. 2006-250705
Patent Document 3: Japanese Patent Application Laid-Open No. 2004-117042

SUMMARY OF THE INVENTION

Problems to be Solved by the Invention

The sensor as described above requires a lot of wiring routing and pressure sensing units to detect the shearing force, and not only complicates its structure but also is disadvantageous in terms of cost. Furthermore, there is also a problem that flexibility required for the sensor decreases.

The present technology has been made in view of the above problems, and it is an object to provide a sensor, an electronic device, a wearable terminal, and a control method capable of detecting the shearing force without complicating configurations thereof.

Solutions to Problems

To solve the problems described above, the present technology is, for example,
a sensor including:
a sensing layer including a pressure detection unit;
a dielectric layer provided on the sensing layer, the dielectric layer being deformable; and
a conductive layer including a protrusion protruding toward the dielectric layer, the conductive layer being movable in an in-plane direction of the sensing layer. The present technology may be an electronic device including the sensor. The present technology may be a wearable terminal including the sensor.

The present technology is, for example, a control method including:
detecting a change in capacitance of a pressure detection unit depending on pressing force or shearing force, by a detection unit; and
executing processing depending on a detection result of the detection unit, by a control unit.

Effects of the Invention

According to at least one embodiment of the present technology, the shearing force can be detected. Note that, the effect described here is not necessarily limited, and may be any effect described in the present technology. Furthermore, the contents of the present technology are not to be construed as being limited by the exemplified effect.

BRIEF DESCRIPTION OF DRAWINGS

FIG. 7A is a diagram schematically illustrating deformation of the sensor due to pressing force, and FIG. 7B is a diagram schematically illustrating deformation of the sensor due to slide operation.

FIGS. 10A, 10B, and 10C are diagrams for explaining the configuration example of the sensor according to the second embodiment.

FIGS. 18A, 18B, and 18C are partial cross-sectional views and operation explanatory diagrams for explaining a configuration example of a sensor according to a modification.

MODE FOR CARRYING OUT THE INVENTION

Hereinafter, embodiments and the like of the present technology will be described with reference to the drawings. Note that, description will be made in the following order.
<1. First Embodiment>
<2. Second Embodiment>
<3. Third Embodiment>
<4. Modifications>
<5. Application Examples>

The embodiments and the like described below are preferred specific examples of the present technology, and the contents of the present technology are not limited to these embodiments and the like.

1. FIRST EMBODIMENT

[Appearance Example of Electronic Device]

Figure 1A:
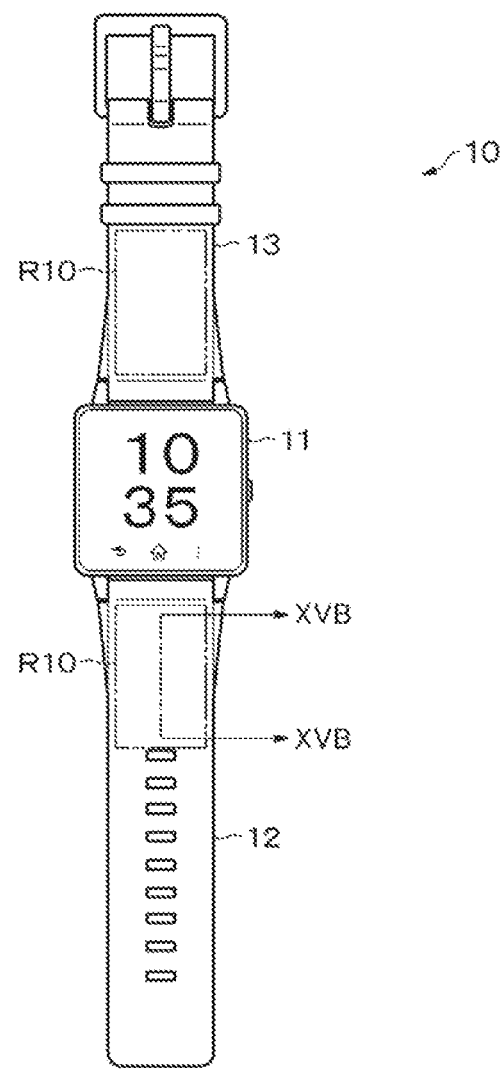
FIG. 1A is a diagram illustrating an appearance example of an electronic device according to an embodiment.
Figure 1B:
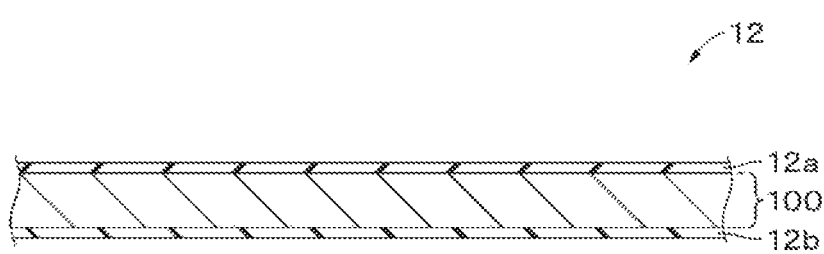
FIG. 1B is a partial cross-sectional view illustrating a partial cross section of the electronic device.

FIGS. 1A and 1B illustrate an appearance example of an electronic device according to a first embodiment of the present technology. The electronic device is, for example, a wristwatch type electronic device 10 detachable to a human body, and is a so-called wearable device. As illustrated in FIG. 1A, the wristwatch type electronic device 10 includes a main body 11, and bands 12 and 13 attached to the main body 11. The bands 12 and 13 may have configurations detachable to the main body 11 so that the bands 12 and 13 can be replaced by a user. The band 12 includes an operation area R10 on one main surface. Inside the operation area R10, a sensor 100 according to the embodiment is provided. Note that, the band 13 may also include the operation area R10.

As illustrated in FIG. 1B, the band 12 includes the sensor 100, a film-like exterior member 12a provided on one main surface of the sensor 100, and a film-like exterior member 12b provided on the other main surface of the sensor 100.

[Configuration of Main Body]

Figure 2:
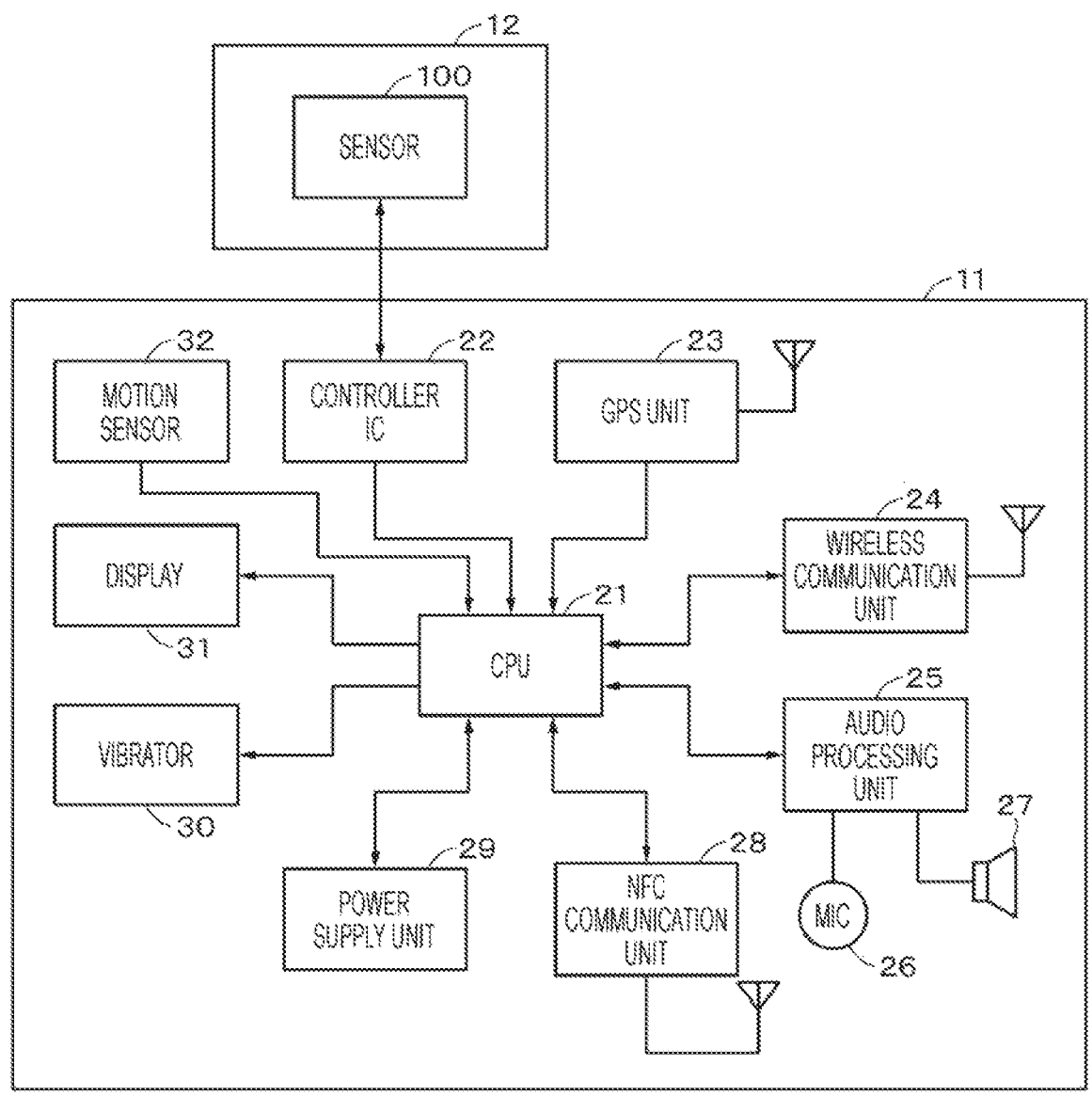
FIG. 2 is a block diagram illustrating a configuration example of an electronic device according to the embodiment.

As illustrated in FIG. 2, the main body 11 includes a CPU 21, a controller integrated circuit (IC) 22, a global positioning system (GPS) unit 23, a wireless communication unit 24, an audio processing unit 25, a microphone (MIC) 26, a speaker 27, a near field communication (NFC) communication unit 28, a power supply unit 29, a vibrator 30, a display 31, and a motion sensor 32. The sensor 100 is connected to the controller IC 22 via a flexible printed display (FPC) (not illustrated). Note that, the bands 12 and 13 may include one of the NFC communication unit 28, the power supply unit 29, the vibrator 30, and the like.

On the basis of an output signal supplied from the sensor 100, the controller IC 22 that is an example of a control unit detects pressing force or shearing force due to pressing operation or slide operation on the operation area R10 of the band 12, and notifies the CPU 21 of the detection result. Note that, as the controller IC 22, a controller IC may be used of a general-purpose capacitance type touch sensor.

The CPU 21 includes memories such as a read only memory (ROM) and a random access memory (RAM), processes data supplied from the sensor 100, the GPS unit 23, the wireless communication unit 24, the NFC communication unit 28, the motion sensor 32, and the like, and controls operation of each part of the wristwatch type electronic device 10.

The GPS unit 23 is a positioning unit that receives a radio wave from a satellite of a system referred to as a GPS and performs positioning of a current position. The wireless communication unit 24 performs short-range wireless communication with another terminal according to the Bluetooth (registered trademark) standard, for example. The NFC communication unit 28 performs wireless communication with a close reader/writer on the basis of a communication standard referred to as NFC. The data obtained by the GPS unit 23, the wireless communication unit 24 and the NFC communication unit 28 are supplied to the CPU 21.

The microphone 26 and the speaker 27 are connected to the audio processing unit 25, and the audio processing unit 25 performs processing of a call with a party connected by wireless communication in the wireless communication unit 24. Furthermore, the audio processing unit 25 can also perform processing for audio input operation.

The power supply unit 29 supplies power to the CPU 21, the display 31, and the like included in the main body 11. The power supply unit 29 includes a secondary battery such as a lithium ion secondary battery, a charge and discharge control circuit that controls charging and discharging of the secondary battery, and the like. Note that, although not illustrated in FIG. 2, the main body 11 includes a terminal for charging the secondary battery.

The vibrator 30 is a member that vibrates the main body 11. For example, the wristwatch type electronic device 10 vibrates the main body 11 with the vibrator 30, and notifies of incoming call, reception of an e-mail, or the like.

The display 31 is a liquid crystal display or an electroluminescence (EL) display, or the like. The display 31 displays information such as a character, a number, a cursor, and an image, for example, various types of information such as time, incoming call, and reception of an e-mail.

The motion sensor 32 detects movement of the user wearing the wristwatch type electronic device 10. As the motion sensor 32, an acceleration sensor, a gyro sensor, an electronic compass, an atmospheric pressure sensor, or the like is used.

The sensor 100 is a pressure sensor with high sensitivity and high position resolution, detects capacitance depending on the pressing operation corresponding to the operation area R10, and outputs an output signal depending on the capacitance to the controller IC 22.

[Configuration of Sensor]

Figure 3:
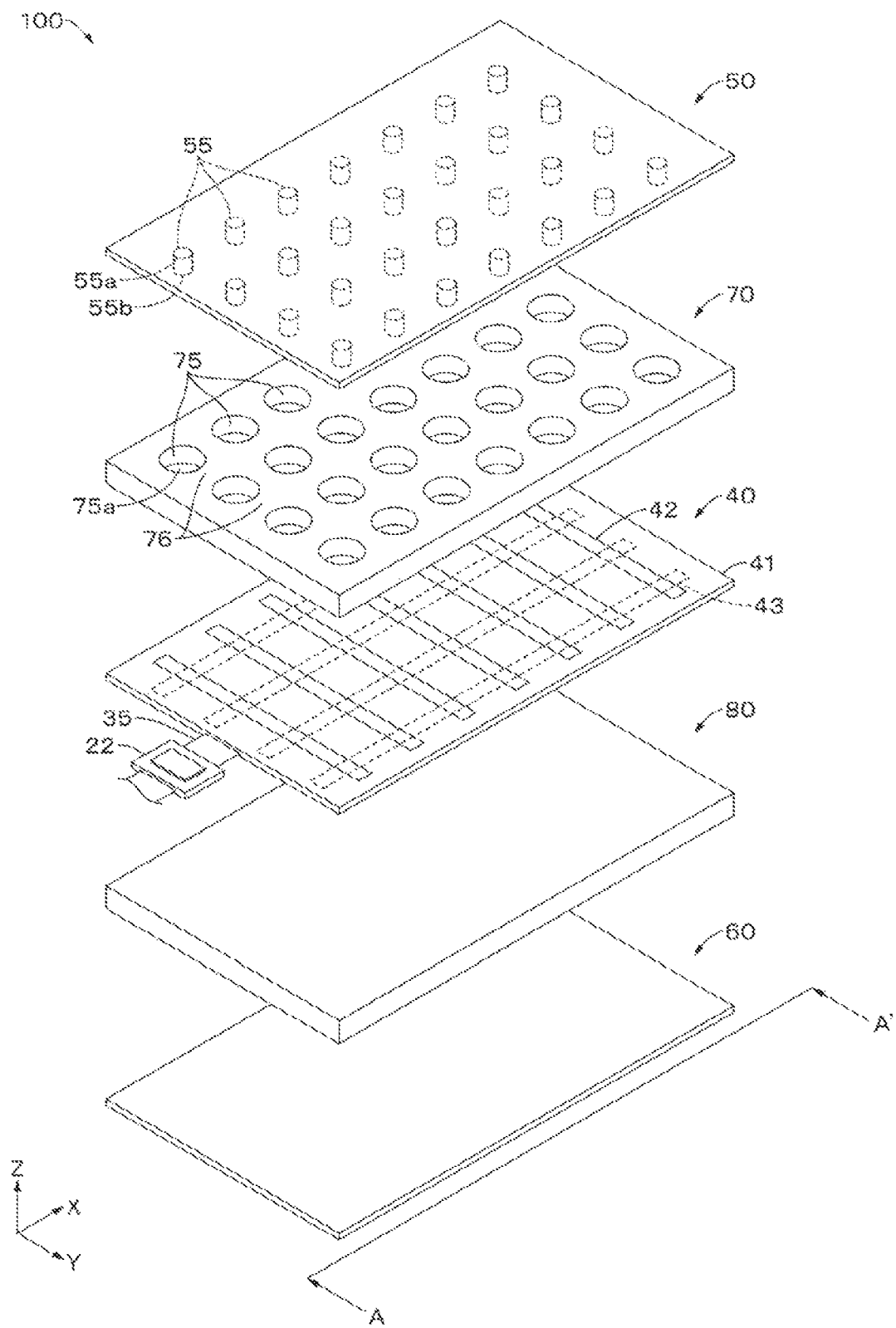
FIG. 3 is an exploded perspective view for explaining a configuration example of a sensor according to a first embodiment.

Next, a configuration of the sensor 100 will be described. FIG. 3 is an exploded perspective view of the sensor 100. The sensor 100 according to the first embodiment of the present technology is a so-called pressure distribution sensor, and as illustrated in FIG. 3, has a long sheet shape, and can detect the pressing force and the slide operation (shearing force generated by slide operation or the like) applied to one main surface. The sensor 100 is connected to the controller IC 22 via an FPC 35.

As illustrated in FIG. 3, the sensor 100 includes a sensing layer 40 of a capacitance type, a first electrode substrate 50, a second electrode substrate 60, a first dielectric layer 70 that is deformable (elastically deformable), and a second dielectric layer 80. Note that, in this specification, as appropriate, longitudinal directions of the sensor 100 in a flat state are referred to as ±X-axis directions, width directions (short directions) are referred to as ±Y-axis directions, and directions perpendicular to the longitudinal directions and the width directions are referred to as ±Z-axis directions. Furthermore, the +Z-axis direction is referred to as an upward direction, and the −Z-axis direction is referred to as a downward direction as appropriate.

Figure 4:
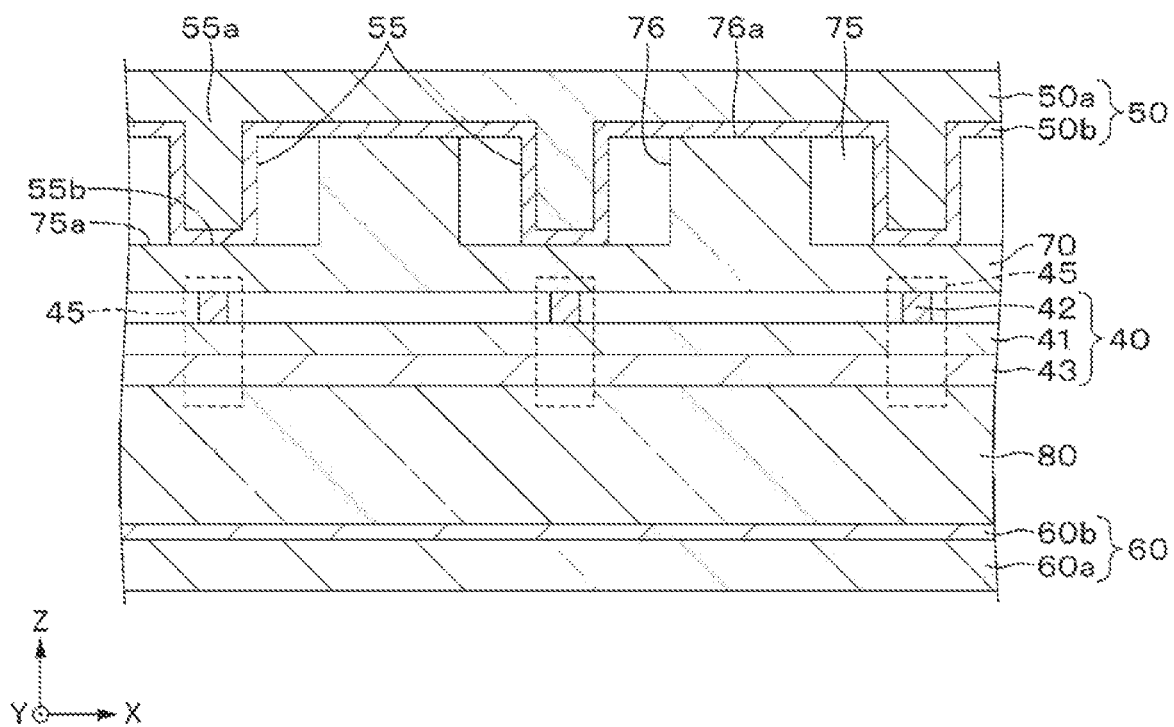
FIG. 4 is a partial cross-sectional view for explaining the configuration example of the sensor according to the first embodiment.

FIG. 4 is a cross-sectional view in a case where the sensor 100 is cut along a cutting line A-A' along the X-axis direction. Hereinafter, each part of the sensor 100 will be described in detail with reference to FIGS. 3 and 4.

(Sensing Layer)

As illustrated in FIGS. 3 and 4, the sensing layer 40 includes a substrate 41, a plurality of pulse electrodes 42 (first electrodes) provided on the upper surface of the substrate 41, a plurality of sensor electrodes 43 (second electrodes) provided on the lower surface of the substrate 41. The plurality of pulse electrodes 42 has a striped shape as a whole. Specifically, the plurality of pulse electrodes 42 extends in the Y-axis direction and is arranged to be separated from each other in the X-axis direction at regular intervals. The plurality of sensor electrodes 43 has a striped shape as a whole. Specifically, the plurality of sensor electrodes 43 extends in the X-axis direction and is arranged to be separated from each other in the Y-axis direction at regular intervals.

As viewed from an operation surface side (upper side in FIG. 3), the pulse electrodes 42 are provided on a nearer side than the sensor electrodes 43. The pulse electrodes 42 and the sensor electrodes 43 are arranged to orthogonally intersect each other, and a plurality of pressure detection units 45 is respectively formed at intersections. When the plurality of pressure detection units 45 is viewed in a plan view from the Z-axis direction, the plurality of pressure detection units 45 is two-dimensionally arranged in a matrix.

A wiring line (not illustrated) is drawn out from one end of each of the pulse electrodes 42 and is routed through the periphery of the substrate 41 and connected to the FPC 35. A wiring line is drawn out also from one end of each of the sensor electrodes 43 and is routed through the periphery of the substrate 41 and connected to the FPC 35.

(Substrate)

The substrate 41 has flexibility. The substrate 41 has, for example, a film-like shape or a plate-like shape. As a material of the substrate 41, either an inorganic material or an organic material can be used, and the organic material is preferably used. As the organic material, for example, a known polymeric material can be used. Specifically, examples of the known polymeric material include triacetyl cellulose (TAC), polyester (TPEE), polyethylene terephthalate (PET), polyethylene naphthalate (PEN), polyimide (PI), polyamide (PA), aramid, polyethylene (PE), polyacrylate, polyether sulfone, polysulfone, polypropylene (PP), diacetyl cellulose, polyvinyl chloride, acrylic resin (PMMA), polycarbonate (PC), epoxy resin, urea resin, urethane resin, melamine resin, cycloolefin polymer (COP), cycloolefin copolymer (COC), and the like.

(Electrode)

The pulse electrodes 42 include, for example, a plurality of electrodes each having a linear shape. The plurality of electrodes extends in the Y-axis direction and is arranged to be separated from each other in the X-axis direction. Intervals between the electrodes adjacent in the X-axis direction may be constant or may be different from each other.

The sensor electrodes 43 include, for example, a plurality of electrodes each having a linear shape. The plurality of electrodes extends in the X-axis direction and is arranged to be separated from each other in the Y-axis direction. Intervals between the electrodes adjacent in the Y-axis direction may be constant or may be different from each other.

As described above, the pressure detection units 45 are formed at portions (intersections) where the electrodes intersect each other. When the controller IC 22 applies a voltage between the electrodes, the intersections of the electrodes form capacitive coupling (line of electric force). The pressure detection units 45 detect a total value of capacitance changes of the plurality of intersections included in the intersections, and output the total value to the controller IC 22. Widths of the electrode are, for example, the same or substantially the same as each other.

Examples of a material of the electrodes include a material similar to a reference electrode layer as described later. Methods can be used as a method of forming the electrodes, for example, a printing method such as screen printing, gravure printing, gravure offset printing, flexographic printing, or inkjet printing, and a patterning method using a photolithography technology.

(Electrode Substrate)

The first electrode substrate 50 and the second electrode substrate 60 are electrode films having flexibility. The first electrode substrate 50 forms one main surface of the sensor 100 and the second electrode substrate 60 forms the other main surface of the sensor 100. Both ends of the first electrode substrate 50 and the second electrode substrate 60 are supported by a support member (not illustrated), for example.

The first electrode substrate 50 includes a substrate 50a having flexibility, and a first reference electrode layer (hereinafter referred to as "first REF electrode layer") 50b as a conductive layer (first conductive layer) provided on one main surface of the substrate 50a. The first electrode substrate 50 is arranged on a side of one main surface of the sensing layer 40 such that the first REF electrode layer 50b faces the one main surface of the sensing layer 40. The first REF electrode layer 50b of the first electrode substrate 50 is movable in an in-plane direction of the sensing layer 40. The second electrode substrate 60 includes a substrate 60a having flexibility, and a second REF electrode layer 60b as a second conductive layer provided on one main surface of the substrate 60a. The second electrode substrate 60 is arranged on a side of the other main surface of the sensing layer 40 such that the second REF electrode layer 60b faces the other main surface of the sensing layer 40. The first electrode substrate 50 and the second electrode substrate 60 can be formed by, for example, hot press molding or the like.

The first REF electrode layer 50b and the second REF electrode layer 60b each are a so-called ground electrode and have a ground potential. Examples of a shape of each of the first REF electrode layer 50b and the second REF electrode layer 60b include a thin film shape, a foil shape, a mesh shape, and the like; however, the shape is not limited thereto.

The first REF electrode layer 50b and the second REF electrode layer 60b only need to have electrical conductivity, and for example, layers can be used such as an inorganic conductive layer containing an inorganic conductive material, an organic conductive layer containing an organic conductive material, and an organic-inorganic conductive layer containing both the inorganic conductive material and the organic conductive material. The inorganic conductive material and the organic conductive material may be particles.

Examples of the inorganic conductive material include metal, metal oxide, and the like. Here, the metal is defined as including semimetal. Examples of the metal include metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, alloys thereof, or the like; however, the metal is not limited thereto. Examples of the metal oxide include indium tin oxide (ITO), zinc oxide, indium oxide, antimony added tin oxide, fluorine added tin oxide, aluminum added zinc oxide, gallium added zinc oxide, silicon doped zinc oxide, zinc oxide-tin oxide type, indium oxide-tin oxide type, and zinc oxide-indium oxide-magnesium oxide type; however, the metal oxide is not limited thereto.

Examples of the organic conductive material include a carbon material, a conductive polymer, and the like. Examples of the carbon material include carbon black, carbon fiber, fullerene, graphene, carbon nanotube, carbon microcoil, nanohorns, and the like; however, the carbon material is not limited thereto. As the conductive polymer, for example, it is possible to use a substituted or unsubstituted polyaniline, polypyrrole, polythiophene, a polymer (copolymer) including one or two selected from these, and the like; however, the conductive polymer is not limited thereto.

The first REF electrode layer 50b and the second REF electrode layer 60b may be thin films prepared by any of a dry process and a wet process. As the dry process, for example, a sputtering method, a vapor deposition method, or the like can be used;
however, the dry process is not particularly limited thereto. The first REF electrode layer 50b and the second REF electrode layer 60b may be a metal-deposited fabric, a plastic film laminated with an aluminum foil, or the like.

The first electrode substrate 50 and the second electrode substrate 60 are respectively provided on both main surface sides of the sensing layer 40, whereby external noise (external electric field) can be inhibited from entering the sensing layer 40 from both main surface sides of the sensor 100.

The first electrode substrate 50 (specifically, the first REF electrode layer 50b) includes a protrusion 55 (first protrusion) protruding toward the first dielectric layer 70. In FIGS. 3 and 4, and the like, only a part of protrusions are denoted by reference numerals. The protrusion 55 in the present embodiment includes a plurality of the protrusions 55, and when the plurality of protrusions 55 is viewed in a plan view from the Z-axis direction, the plurality of protrusions 55 each has a dot shape and is two-dimensionally arranged in a matrix. The protrusions 55 and the above-described pressure detection units 45 are provided at corresponding positions, respectively. The protrusions 55 each have a bottom 55a on the substrate 50a side and a top 55b at the tip (an end on the first dielectric layer 70 side). For example, the protrusions 55 each have a cylindrical shape, but may have other shapes such as a prismatic shape, and a frustum.

(Dielectric Layer)

The first dielectric layer 70 is provided on the side of the one main surface of the sensing layer 40. The second dielectric layer 80 is provided on the side of the other main surface of the sensing layer 40. The first dielectric layer 70 and the second dielectric layer 80 are deformable layers that are elastically deformable.

The first dielectric layer 70 and the sensing layer 40 are bonded together by a bonding layer (not illustrated). Furthermore, the sensing layer 40 and the second dielectric layer 80 are bonded together by a bonding layer (not illustrated). These bonding layers each include an adhesive. As the adhesive, for example, one or more can be used selected from a group consisting of an acrylic adhesive, a silicone adhesive, a urethane adhesive, and the like. In this specification, pressure sensitive adhesion is defined as a type of adhesion.

The first dielectric layer 70 and the second dielectric layer 80 are films that are elastically deformed by pressure applied to the operation surface of the sensor 100. The first dielectric layer 70 and the second dielectric layer 80 each include a dielectric such as a foamed resin or an insulating elastomer. The foamed resin is a so-called sponge, and is, for example, at least one of foamed polyurethane, foamed polyethylene, foamed polyolefin, sponge rubber, or the like. The insulating elastomer is, for example, at least one of a silicone elastomer, an acrylic elastomer, a urethane elastomer, a styrene elastomer, or the like.

When the first dielectric layer 70 and the second dielectric layer 80 are viewed in a plan view from a direction (Z-axis direction) perpendicular to their main surfaces, the first dielectric layer 70 and the second dielectric layer 80 each have a rectangular shape. However, the shape of each of the first dielectric layer 70 and the second dielectric layer 80 is not limited thereto, and may be a circular shape, an elliptic shape, a polygonal shape other than the rectangular shape, an indefinite shape, or the like.

The first dielectric layer 70 includes a recess 75 recessed downward from the first electrode substrate 50 side. The recess 75 is formed, whereby elastic protrusions 76 are formed protruding toward the first electrode substrate 50. In FIGS. 3 and 4, and the like, only a part of recesses and elastic protrusions are denoted by reference numerals. The recess 75 in the present embodiment includes a plurality of the recesses 75, and when the plurality of recesses 75 is viewed in a plan view from the Z-axis direction, the plurality of recesses 75 each has a dot shape and is two-dimensionally arranged in a matrix shape. The recesses 75 and the above-described protrusions 55 and pressure detection units 45 are provided at corresponding positions, respectively. In other words, as illustrated in FIG. 4, the top 55b of each of the protrusions 55 comes into contact with a bottom 75a that is a bottom of each of the recesses 75. The pressure detection units 45 are arranged below the contact portions. Furthermore, a top 76a that is the tip of each of the elastic protrusions 76 comes into contact with the first REF electrode layer 50b.

Figure 5A:
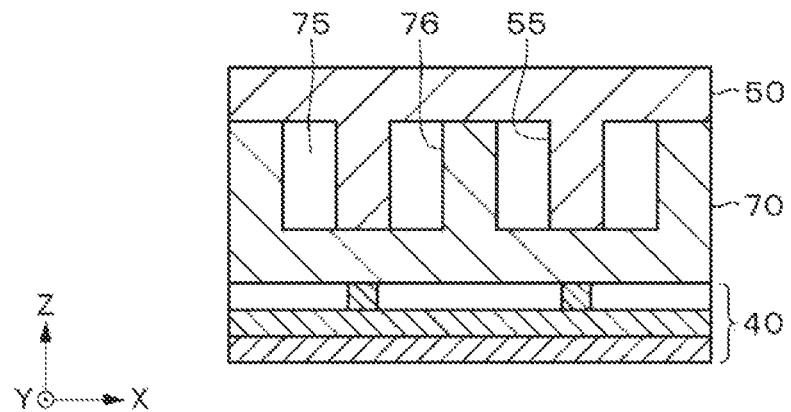
FIGS. 5A, 5B, and 5C are diagrams for explaining the configuration example of the sensor according to the first embodiment.
Figure 5B:
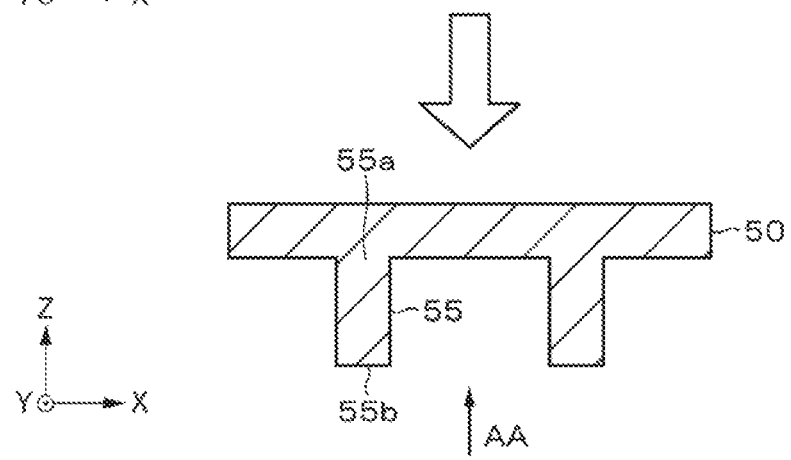
Figure 5C:
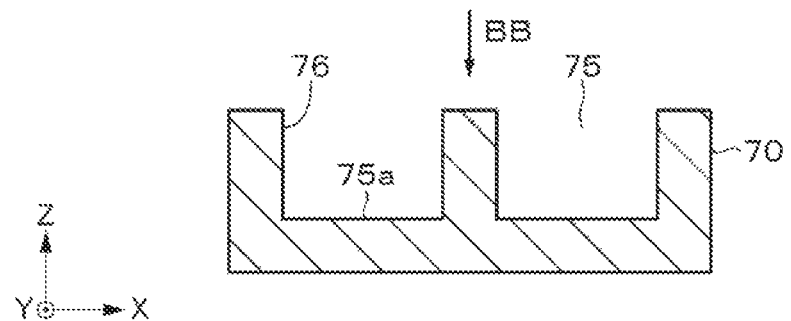

FIG. 5A is a partial cross-sectional view illustrating a cross section of a part of the sensor 100, FIG. 5B illustrates the first electrode substrate 50 of the sensor 100 illustrated in FIG. 5A, and FIG. 5C illustrates the first dielectric layer 70 of the sensor 100 illustrated in FIG. 5A. Note that, in FIG. 5 and the like, the substrate 50a and the first REF electrode layer 50b of the first electrode substrate 50 may be illustrated integrally without distinction as appropriate. The substrate 60a and the second REF electrode layer 60b of the second electrode substrate 60 are illustrated similarly.

Figure 6C:
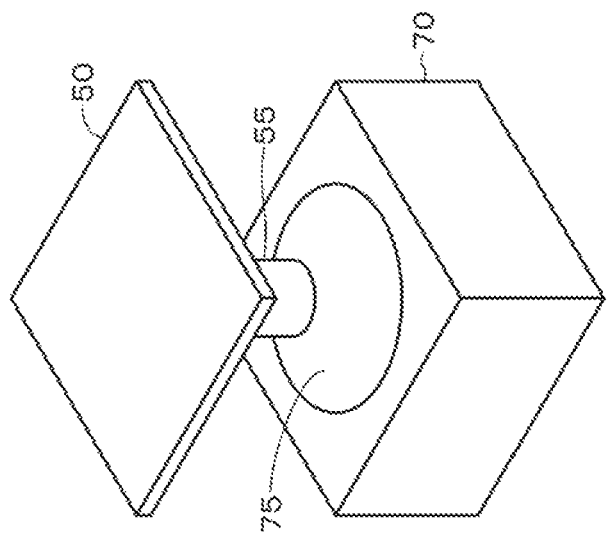
FIGS. 6A, 6B, and 6C are diagrams for explaining the configuration example of the sensor according to the first embodiment.
Figure 6A:
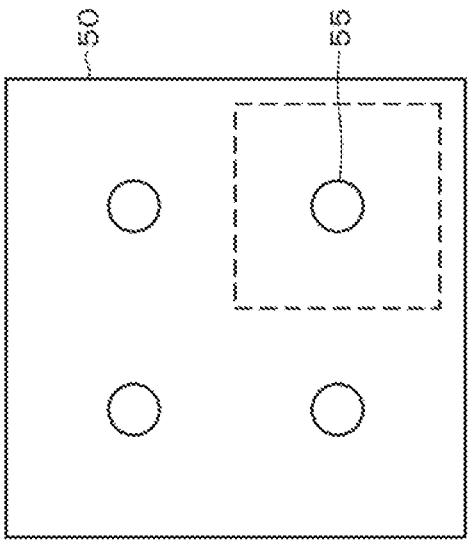
Figure 6B:
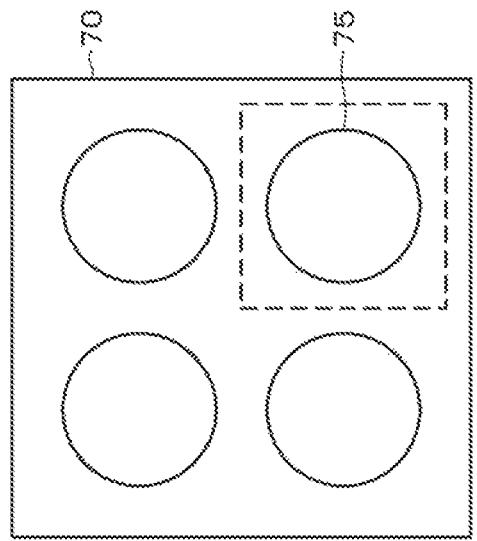

FIG. 6A is a view taken in a direction of an arrow AA in FIG. 5B, FIG. 6B is a view taken in a direction of an arrow BB in FIG. 5B, and FIG. 6C is a perspective view illustrating a portion surrounded by dotted lines in FIGS. 6A and 6B. As described above, the protrusions 55 and the recesses 75 are provided to correspond to each other, respectively. The protrusions 55 are respectively accommodated in the recesses 75, and the top 55b of each of the protrusions 55 comes in contact with the bottom 75a in a corresponding one of the recesses 75. Note that, the recesses 75 are respectively wider than the protrusions 55 to an extent that the first dielectric layer 70 is deformable by slide operation or the like to be described later. The shape of each of the recesses 75 is not limited to the cylindrical shape and can be changed as appropriate.

"Operation Example of Sensor"

Next, an operation example of the sensor 100 will be described. FIGS. 7A and 7B are diagrams illustrating partial deformation of the sensor 100 that may be caused by operation or an unintended phenomenon (for example, rubbing due to contact between a device including the sensor 100 and another object (bag, clothes, and the like)). FIG. 7A illustrates deformation of the sensor 100 due to the pressing operation in the Z-axis direction, for example, and FIG. 7B illustrates deformation of the sensor 100 due to the slide operation in the X-axis direction, for example.

When the pressing force is applied to the first electrode substrate 50, the first dielectric layer 70 is locally compressed and deformed, so that the first electrode substrate 50 (specifically, the first REF electrode layer 50b) approaches one of the pressure detection units 45 (the pulse electrodes 42 and the sensor electrodes 43 on the material 41). Since the substrate 41 is not compressed, capacitance between each of the pulse electrodes 42 and a corresponding one of the sensor electrodes 43 is constant regardless of the presence or absence of the pressing force. When the first electrode substrate 50 approaches, electric field leakage occurs from the pulse electrodes 42 and the respective sensor electrodes 43, so that the capacitance between each of the pulse electrodes 42 and a corresponding one of the sensor electrodes 43 decreases. By detecting the decrease of the capacitance, it is possible to detect the pressing force on the sensor 100.

On the other hand, the elastic protrusions 76 of the first dielectric layer 70 are deformed along the in-plane direction depending on the slide operation. In this deformation, contrary to deformation by the pressing force, the first electrode substrate 50 (specifically, the first REF electrode layer 50b) moves away from the pulse electrodes 42 and the sensor electrodes 43, and the capacitance increases. By detecting the increase in the capacitance, it is possible to detect the shearing force due to, for example, the slide operation on the sensor 100. Note that, a magnitude of the pressing force, a magnitude of the shearing force, and an amount of the slide may be detected on the basis of the capacitance change. When the slide operation is ended, each of the elastic protrusions 76 returns to its original shape.

In the first embodiment described above, the pressing force and the shearing force on the sensor can be distinguished and detected. Furthermore, in the first embodiment, the shearing force can be detected in the in-plane direction, for example, two axial directions (specifically, the X-axis direction and the Y-axis direction orthogonal to each other).

In the structure of the sensor according to the first embodiment, it is unnecessary to increase the wiring routing and the pressure detection unit, and the configuration is not complicated. Furthermore, the flexibility of the sensor is not excessively impaired.

Second Embodiment

Next, a second embodiment will be described. Note that, the matters described in the first embodiment can be applied to the second embodiment unless otherwise specified. In the second embodiment, the shapes of the protrusion and the recess are different from those in the first embodiment.

Figure 8:
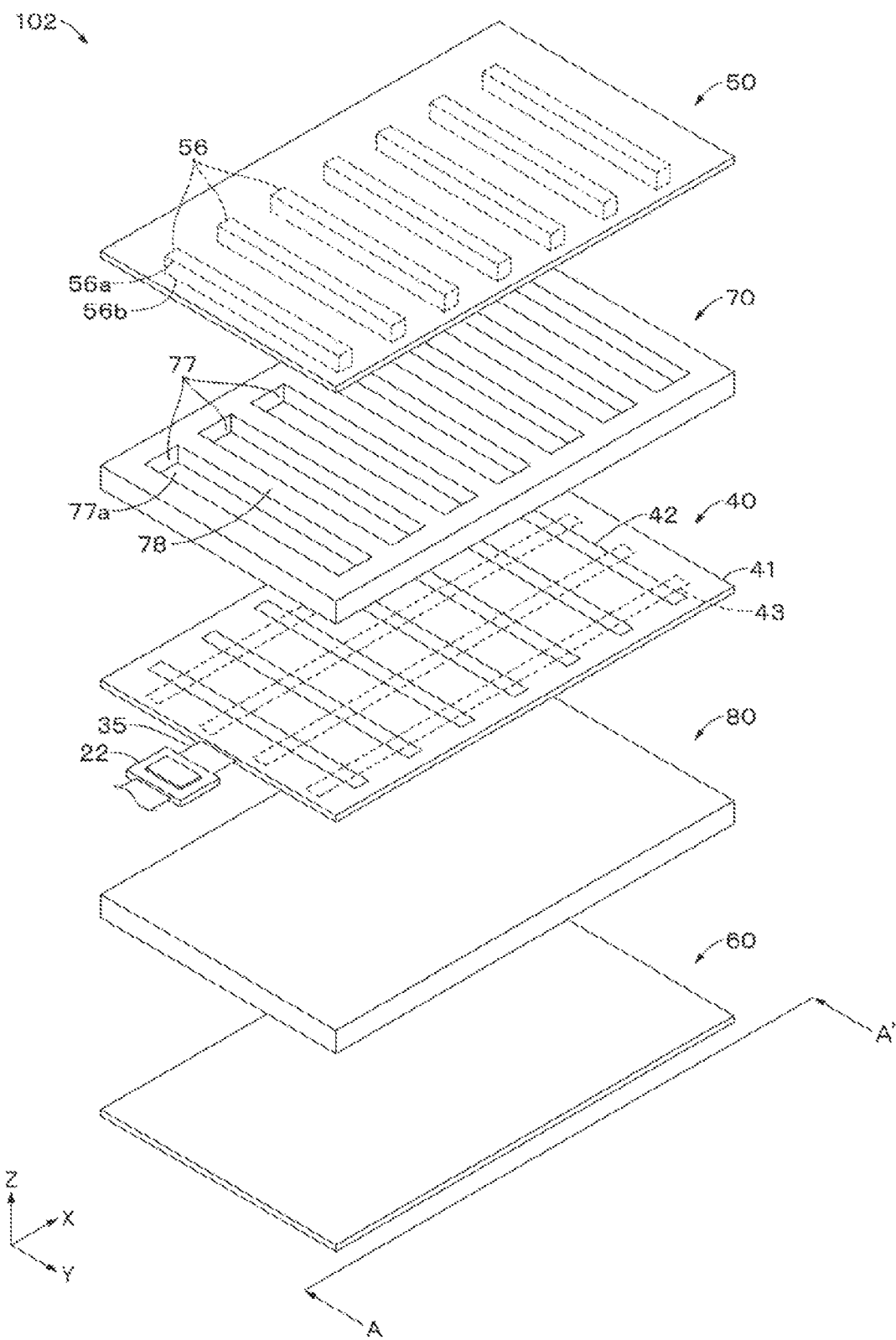
FIG. 8 is an exploded perspective view for explaining a configuration example of a sensor according to a second embodiment.

FIG. 8 is an exploded perspective view for explaining a configuration of a sensor (a sensor 102) in the second embodiment. The first REF electrode layer 50b includes a protrusion 56 protruding toward the first dielectric layer 70. The protrusion 56 in the present embodiment includes a plurality of the protrusions 56, and when the plurality of protrusions 56 is viewed in a plan view from the Z-axis direction, the plurality of protrusions 56 each has a linear shape, and is arranged to be separated from each other in the X-axis direction. Partial portions of the protrusions 56 and the above-described pressure detection units 45 are provided at corresponding positions, respectively.

In the first dielectric layer 70, recesses 77 are provided, each of which is recessed downward from the first electrode substrate 50 side. Each of the recesses 77 is a recess having a rectangular shape in a plan view from the Z-axis direction corresponding to the shape of each of the protrusions 56. The recesses 77 are formed, whereby elastic protrusions 78 are formed protruding toward the first electrode substrate 50.

Figure 9A:
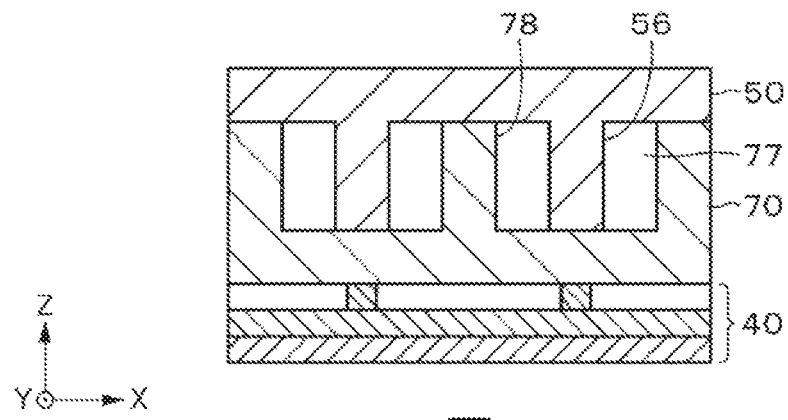
FIGS. 9A, 9B, and 9C are diagrams for explaining the configuration example of the sensor according to the second embodiment.
Figure 9B:
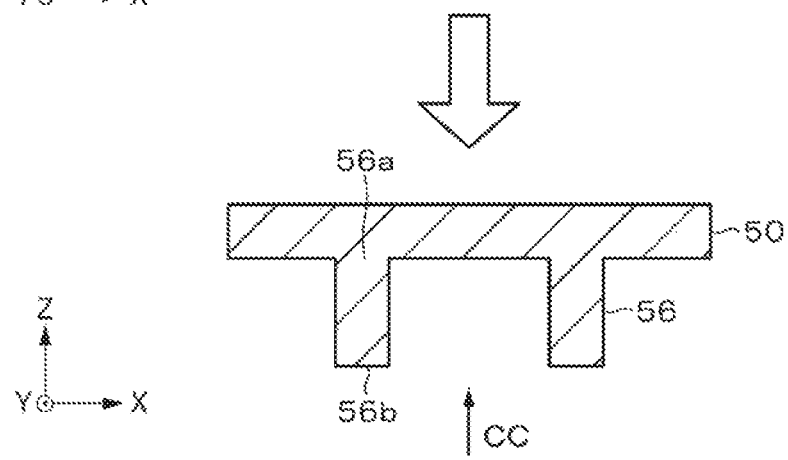
Figure 9C:
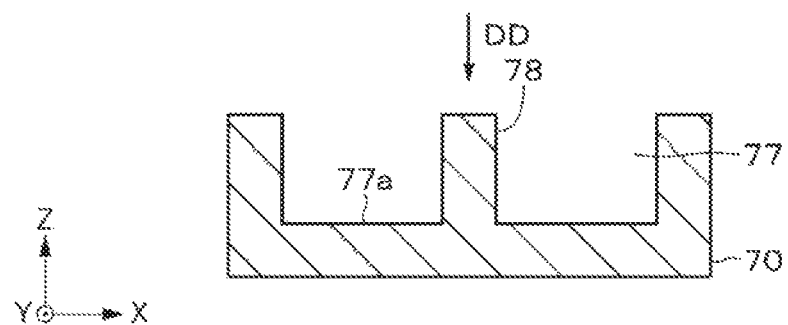

FIG. 9A is a partial cross-sectional view illustrating a cross section of a part of the sensor 102, FIG. 9B illustrates the first electrode substrate 50 of the sensor 102 illustrated in FIG. 9A, and FIG. 9C illustrates the first dielectric layer 70 of the sensor 102 illustrated in FIG. 9A.

FIG. 10A is a view taken in a direction of an arrow CC in FIG. 9B, FIG. 10B is a view taken in a direction of an arrow DD in FIG. 9B, and FIG. 10C is a perspective view illustrating a portion surrounded by dotted lines in FIGS. 10A and 10B. The protrusions 56 and the recesses 77 are provided to correspond to each other, respectively. The protrusions 55 are respectively accommodated in the recesses 77, and a top 56b of each of the protrusions 56 comes into contact with a bottom 77a in a corresponding one of the recesses 77. Note that, the recesses 77 are respectively wider than the protrusions 56 to an extent that the first dielectric layer 70 is deformable by the slide operation or the like.

Since operation and the like of the sensor 102 are similar to those in the first embodiment, duplicate descriptions are omitted. Also in the second embodiment, effects similar to those in the first embodiment can be obtained. According to the second embodiment, the slide operation or the like can be detected in, for example, one axis direction, specifically, a direction orthogonal to an extending direction of the protrusions 56. The sensor according to the second embodiment is suitable for an application in which the shearing force only needs to be detected only in one axial direction.

3. Third Embodiment

Next, a third embodiment will be described. Note that, the matters described in the first and second embodiments can be applied to the third embodiment unless otherwise specified. In the third embodiment, two or more (for example, two) pressure detection units 45 are provided to correspond to each of the protrusions 55.

Figure 11:
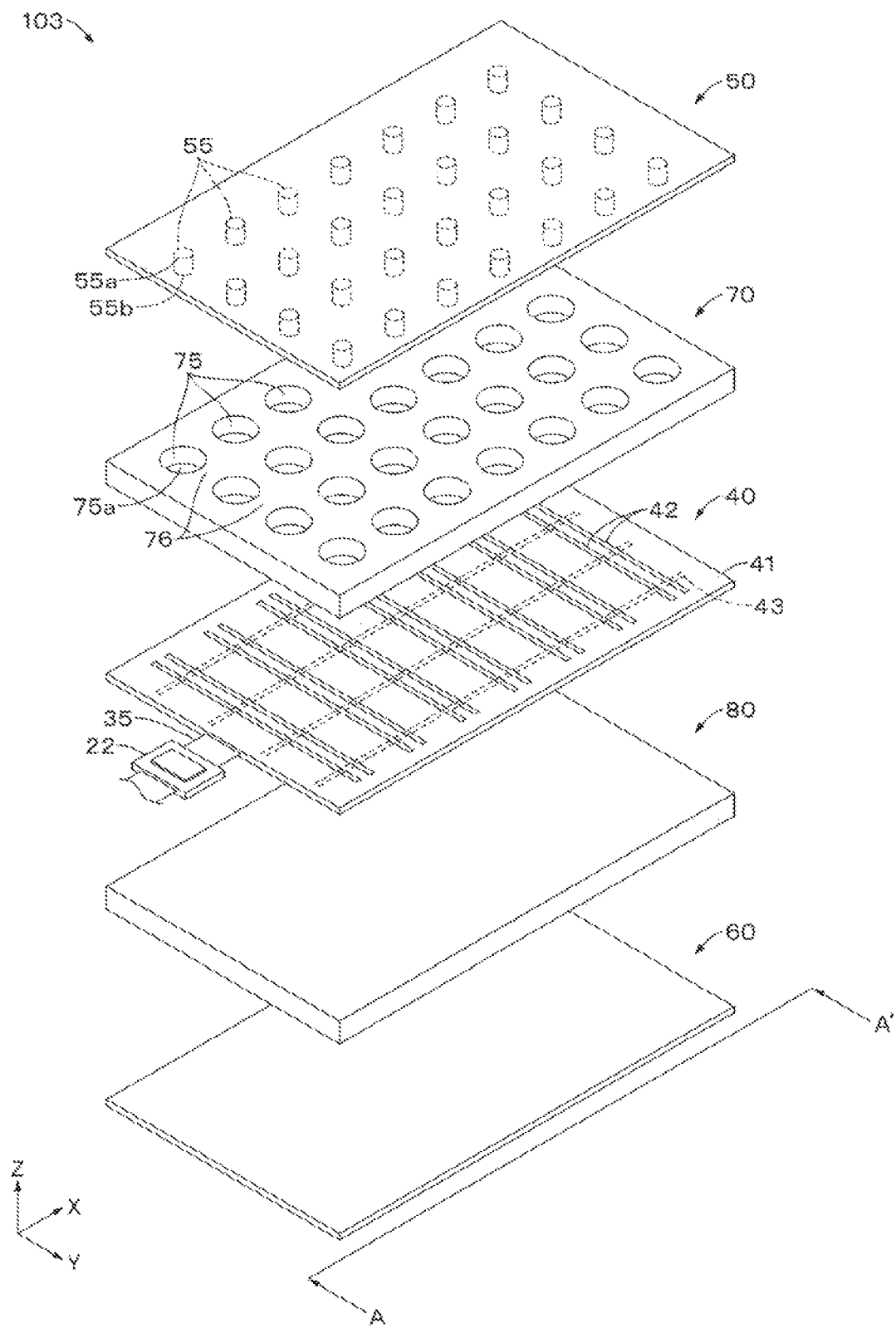
FIG. 11 is an exploded perspective view for explaining a configuration example of a sensor according to a third embodiment.
Figure 12:
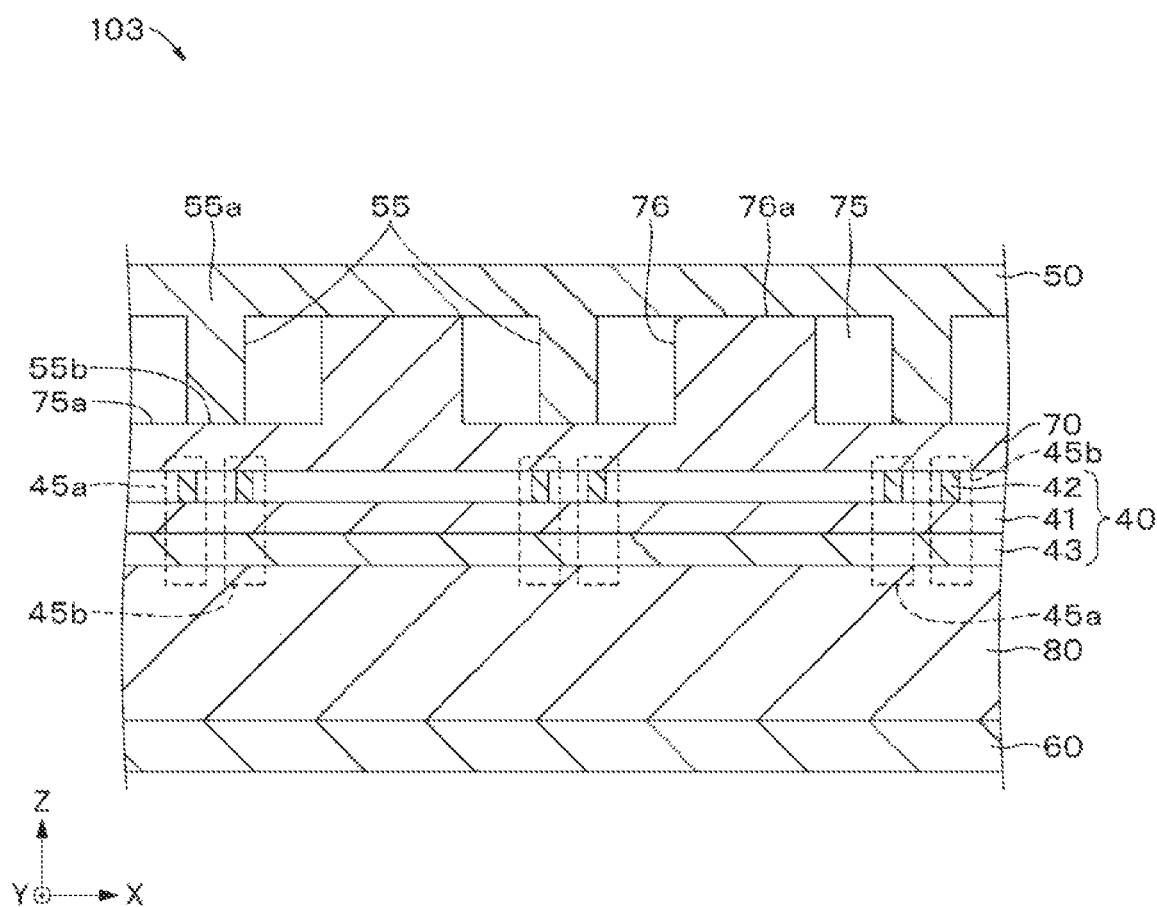
FIG. 12 is a partial cross-sectional view for explaining the configuration example of the sensor according to the third embodiment.

FIG. 11 is a decomposer perspective view for explaining a configuration of a sensor (sensor 103) in the third embodiment. FIG. 12 is a cross-sectional view illustrating a part of a cross section in a case where the sensor 103 is cut along a cutting line A-A' in FIG. 11. As illustrated in FIGS. 11 and 12, two pressure detection units 45a and 45b arranged close to each other correspond to each of the protrusions 55.

Figure 13:
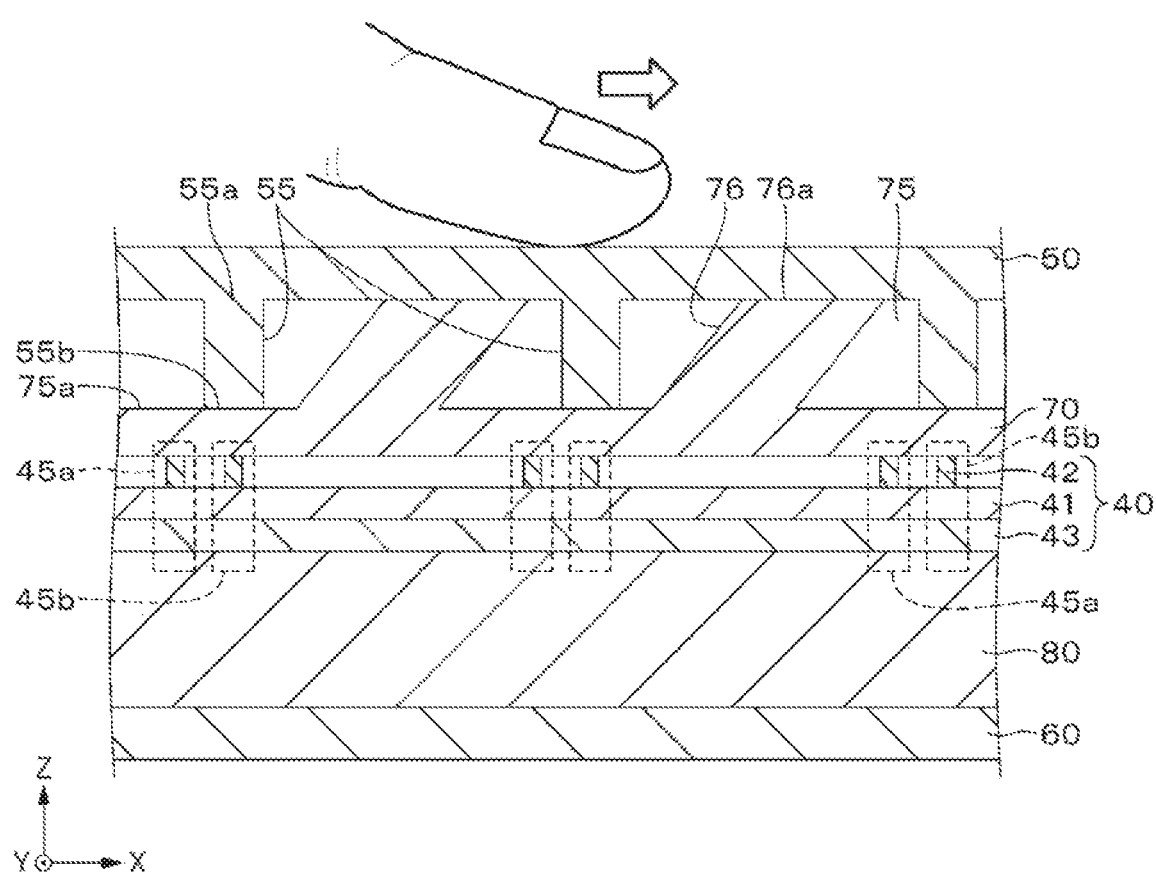
FIG. 13 is a diagram schematically illustrating deformation of the sensor due to slide operation.

FIG. 13 illustrates partial deformation of the sensor 103 due to the slide operation in one direction (right direction in FIG. 13) in the X-axis direction, for example. Depending on the slide operation, the first dielectric layer 70 is deformed along the in-plane direction. In this deformation, the first electrode substrate 50 (specifically, the first REF electrode layer 50b) moves away from the pressure detection unit 45a, and approaches the pressure detection unit 45b. Thus, the capacitance increases between each of the pulse electrodes 42 and a corresponding one of the sensor electrodes 43 in the pressure detection unit 45a, and the capacitance decreases between each of the pulse electrodes 42 and a corresponding one of the sensor electrodes 43 in the pressure detection unit 45b. On the other hand, for example, in a case where the slide operation is performed in the other direction (the left direction in FIG. 13) in the X-axis direction, the first electrode substrate 50 (specifically, the first REF electrode layer 50b) approaches the pressure detection unit 45a, and moves away from the pressure detection unit 45b. Thus, the capacitance decreases between each of the pulse electrodes 42 and a corresponding one of the sensor electrodes 43 in the pressure detection unit 45a, and the capacitance increases between each of the pulse electrodes 42 and a corresponding one of the sensor electrodes 43 in the pressure detection unit 45b. In other words, on the basis of the increase or decrease of the capacitance in individual pressure detection units 45, it is possible to detect not only the shearing force but also the direction of the slide operation.

As described above, in the third embodiment, the direction of the slide can also be detected. Note that, in the third embodiment, each of the protrusions 55 and three or more pressure detection units 45 may correspond to each other.

Note that, in the third embodiment, when the slide operation is further performed, the first electrode substrate 50 (specifically, the first REF electrode layer 50b) may move away from the pressure detection unit 45a and the pressure detection unit 45b. In this case, since the distance (degree of moving away) differs by which the first electrode substrate 50 moves away, the degree of increase in the capacitance varies depending on each pressure detection unit. For example, in a case where the slide operation is performed in one direction (the right direction in FIG. 13) in the X-axis direction, the first electrode substrate 50 (specifically, the first REF electrode layer 50b) moves away from the pressure detection unit 45a farther than from the pressure detection unit 45b. An increase amount of the capacitance of the pressure detection unit 45a is therefore larger than an increase amount of the capacitance of the pressure detection unit 45b. On the other hand, for example, in a case where the slide operation is performed in the other direction (the left direction in FIG. 13) in the X-axis direction, on the contrary, the increase amount of the capacitance of the pressure detection unit 45b is larger than the increase amount of the capacitance of the pressure detection unit 45a. In other words, the direction of the slide operation can be detected by comparing the increase amounts of the capacitance. Note that, the movement of the first REF electrode layer 50b may be restricted so that changes in the capacitance in the two pressure detection units 45 due to the slide operation respectively become "increase" and "decrease" as described in the third embodiment.

4. Modifications

The embodiments of the present technology have been specifically described above; however, not limited to the embodiments described above, various modifications can be made based on the technical idea of the present technology. Hereinafter, a plurality of modifications will be described.

Modification 1

Figure 14:
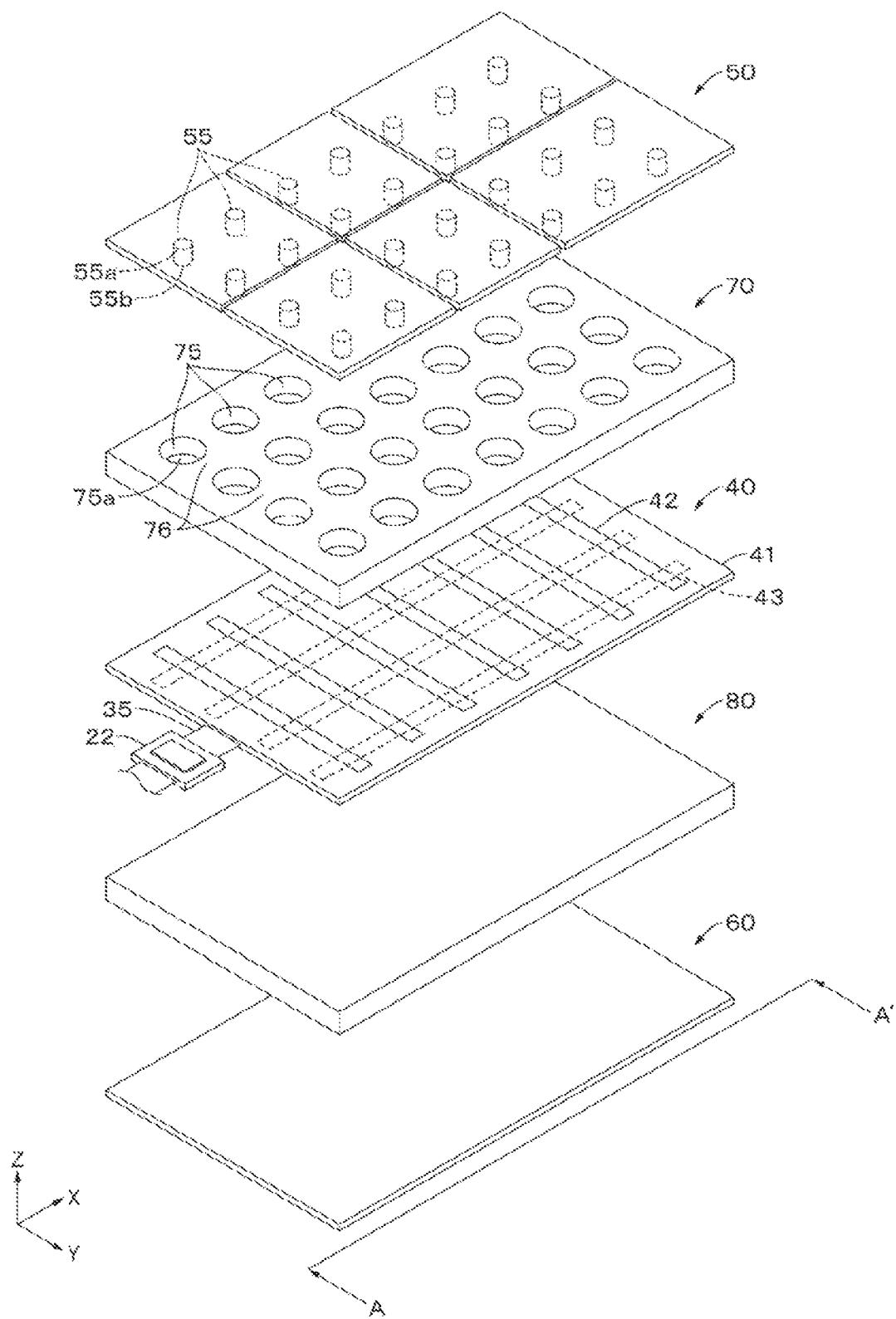
FIG. 14 is an exploded perspective view for explaining a configuration example of a sensor according to a modification.

FIG. 14 is an exploded perspective view for explaining a configuration of a sensor in Modification 1. As illustrated in FIG. 14, the first electrode substrate 50 (specifically, the first REF electrode layer 50b) may be divided in the in-plane direction. Then, the pressing force or the shearing force may be detected in areas divided. Since the pressing force or the shearing force in the areas can be individually detected, it is possible to detect the pressing force and the slide due to multipoint touch operation or the like. Note that, sizes of the areas divided of the first electrode substrate 50 may be the same as each other or different from each other.

Modification 2

Figure 15:
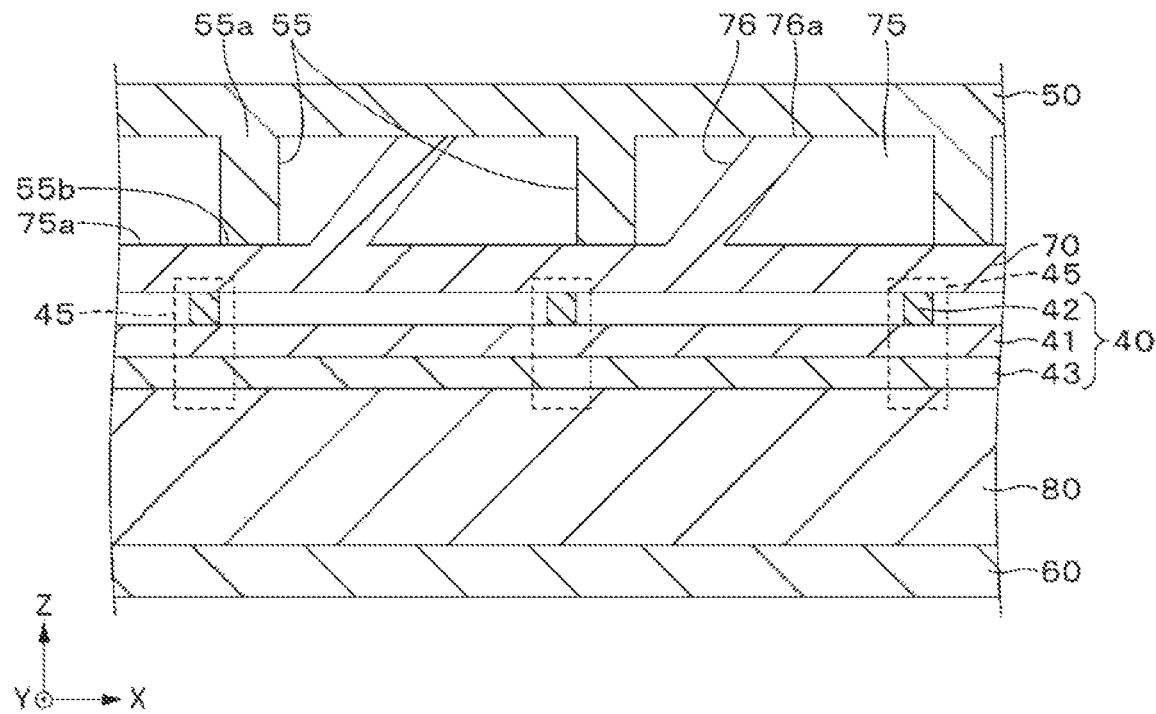
FIG. 15 is a partial cross-sectional view for explaining a configuration example of a sensor according to a modification.

FIG. 15 is a diagram illustrating a part of a cross section of a sensor in Modification 2. By changing the structure of the first dielectric layer 70, it is possible to control a load required for deformation by the slide operation or the like. For example, as illustrated in FIG. 15, by decreasing or increasing a size of each of the elastic protrusions 76 in the width direction (X-axis direction), it is possible to control the load required for deformation by the slide operation or the like. Furthermore, the top 76a of all or part of the elastic protrusions 76 of the first dielectric layer 70 may be bonded to the first electrode substrate 50. The load required for deformation by the slide operation or the like can be controlled also by the number of portions bonded.

Modification 3

Figure 16:
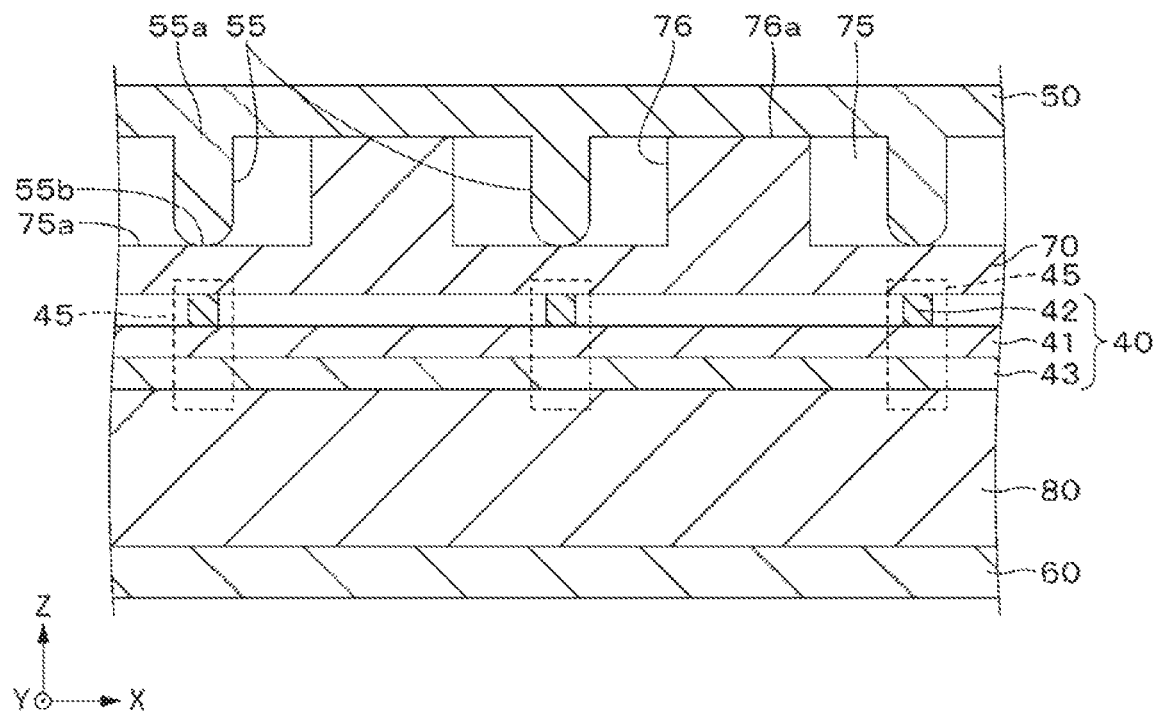
FIG. 16 is a partial cross-sectional view for explaining a configuration example of a sensor according to a modification.

FIG. 16 is a diagram illustrating a part of a cross section of a sensor in Modification 3. The top 55b that is the tip of each of the protrusions 55 may be rounded. As a result, the first electrode substrate 50 can be easily slid in the in-plane direction.

Modification 4

Figure 17:
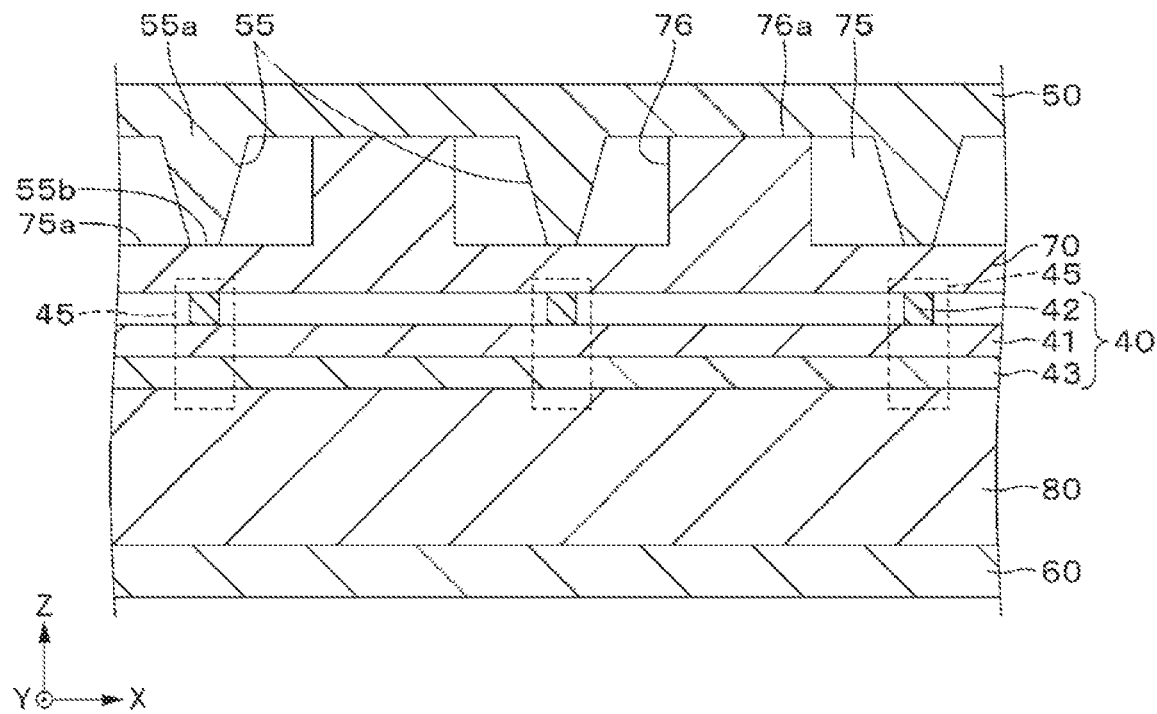
FIG. 17 is a partial cross-sectional view for explaining a configuration example of a sensor according to a modification.

FIG. 17 is a diagram illustrating a part of a cross section of a sensor in Modification 4. The protrusions 55 each may have a side surface inclined such that the width becomes narrower from the bottom 55a to the top 55b of each of the protrusions 55. With this configuration, abrupt change can be suppressed in the capacitance, and it is possible to easily detect the presence or absence of the slide, a slide amount, and the like.

Modification 5

FIGS. 18A, 18B, and 18C are diagrams each illustrating an example of a cross section of a sensor in a Modification 5. Elastic protrusions included in the first dielectric layer 70 each may have a configuration enabled to change in stages a load applied to protrusions (for example, the protrusions 55) of the first electrode substrate 50 at the time of movement in the in-plane direction of the first electrode substrate 50. For example, as illustrated in FIG. 18A, the first dielectric layer 70 may include elastic protrusions 76b protruding toward the first electrode substrate 50. Each of the elastic protrusions 76b is provided between one of the protrusions 55 and one of the elastic protrusions 76 in one of the recesses 75, and for example, has an inverted L-shaped cross section. Note that, the elastic protrusions 76b are not in contact with the first electrode substrate 50 in an initial state (a stage where there is no slide operation or the like).

As illustrated in FIG. 18B, when the slide operation is performed, the protrusions 55 of the first electrode substrate 50 come into contact with the elastic protrusions 76b at a certain stage. As a result, suppressing force acts that suppresses the movement in the direction of the slide operation. Then, as illustrated in FIG. 18C, to further continue the slide operation, it is necessary to apply force against the suppressing force by the elastic protrusions 76b. By providing predetermined elastic protrusions on the first dielectric layer 70 in this way, the load required for the slide operation can be changed in stages. Furthermore, it is possible to provide operation that can give a new operation feeling.

Modification 6

Figure 19:
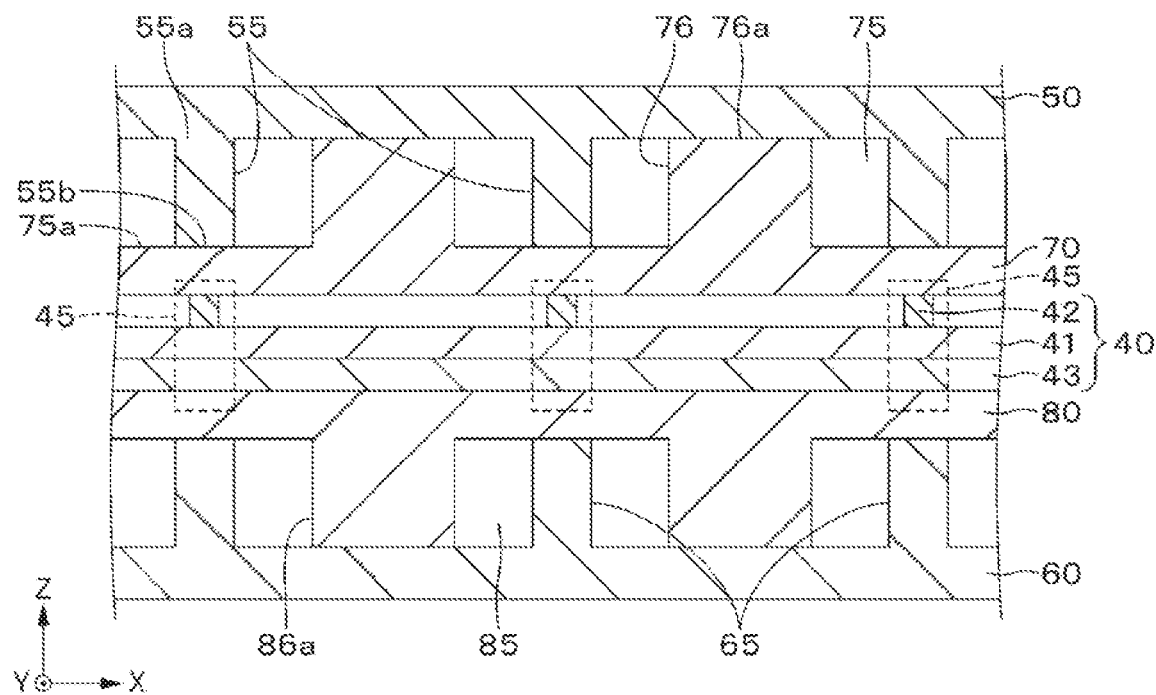
FIG. 19 is a partial cross-sectional view for explaining a configuration example of a sensor according to a modification.

FIG. 19 is a cross-sectional view illustrating a part of a cross section of a sensor according to a Modification 6. In the above-described embodiments and the like, the protrusions 55 are provided on the first electrode substrate 50 on one surface of the sensor, and the recesses 75 and the like are provided in the first dielectric layer 70. The other surface of the sensor may have a similar configuration. In other words, the second electrode substrate 60 may be made to be movable in the in-plane direction of the sensing layer 40, and the second electrode substrate 60 (specifically, the second REF electrode layer 60b) may include protrusions 65 protruding toward the second dielectric layer 80. Then, the second dielectric layer 80 may be provided with a recess 85 and an elastic protrusion 86 (second protrusion) protruding toward the second electrode substrate 60. Furthermore, the second electrode substrate 60 and the second dielectric layer 80 may be provided with the configurations described in the above-described modifications. With this configuration, for example, both the first dielectric layer 70 and the second dielectric layer 80 are deformed by the pressing operation, so that it is possible to increase a change in the capacitance and to increase load sensitivity of the sensor.

Modification 7

Figure 20A:
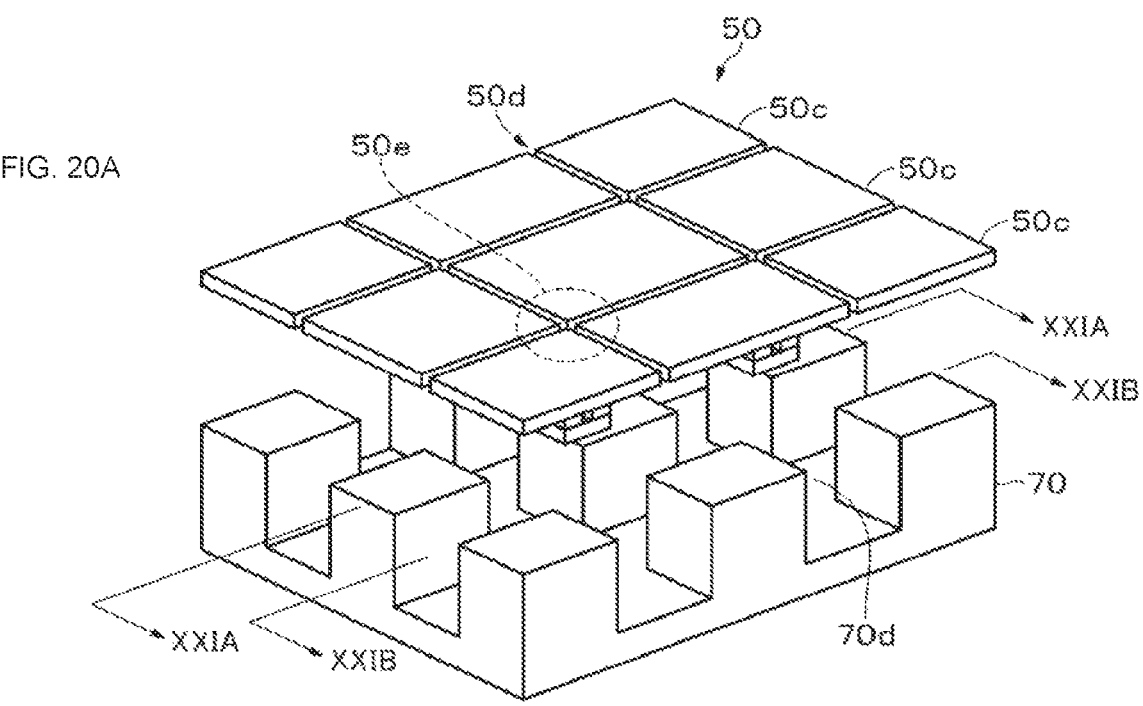
FIG. 20A is an exploded perspective view for explaining a partial configuration example of a sensor according to a modification.
Figure 20B:
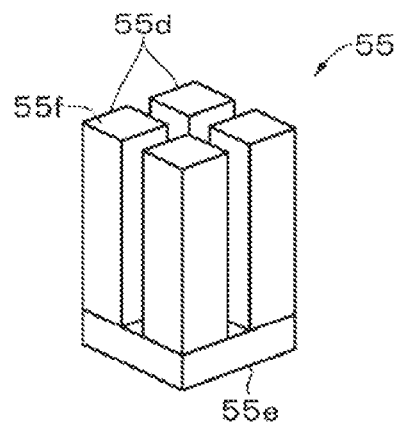
FIG. 20B is a partially enlarged view of the sensor according to the modification.

A sensor may have a structure that provides more flexibility. FIG. 20A is a decomposer perspective view illustrating a configuration of a part of a sensor in Modification 7, and FIG. 20B is an enlarged view of one of the protrusions 55 of the first electrode substrate 50 in Modification 7. For example, a lattice-like groove 50d is provided in the first electrode substrate 50, and the first electrode substrate 50 is divided into a plurality of electrode substrates 50c. A corner portion 50e is formed by four corresponding corners of the four electrode substrates 50c adjacent to each other. Furthermore, a lattice-like groove 70d is provided also in the first dielectric layer 70.

As illustrated in FIG. 20B, one of the protrusions 55 is divided into a plurality (for example, four) of columnar protrusions 55d, and the tops of the protrusions 55d are integrally connected together by a rectangular connection plate 55e. Bottoms 55f of the respective four protrusions 55d are provided in the vicinity of the corners of the four electrode substrates 50c forming the corner portion 50e. Note that, the protrusions 55 each are arranged at a position corresponding to an intersection where grooves forming the groove 70d orthogonally intersect each other.

Figure 21A:
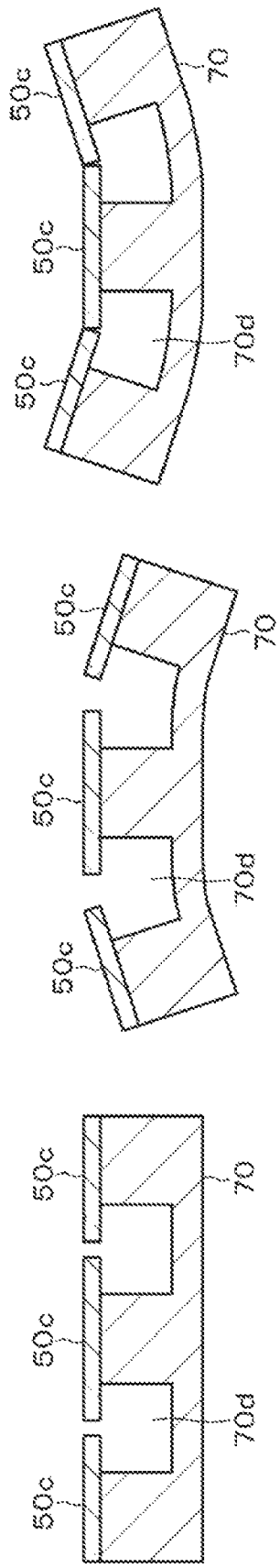
FIGS. 21A and 21B are diagrams schematically illustrating deformation of the sensor due to bending.
Figure 21B:
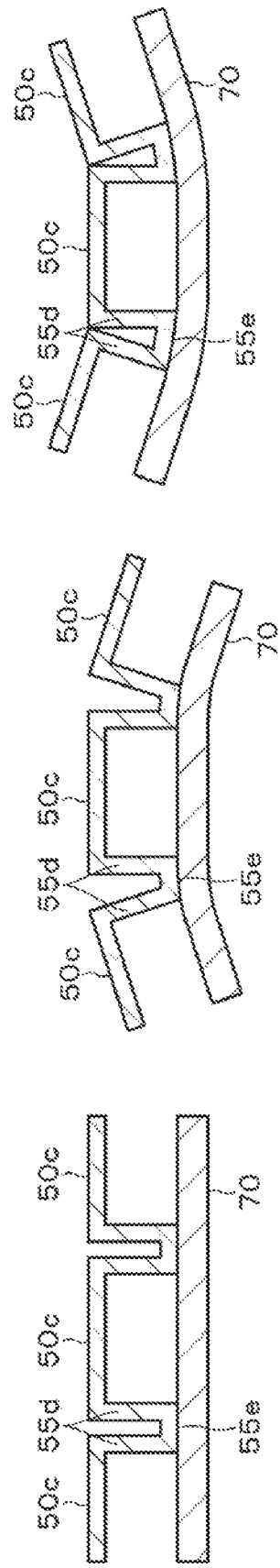

FIG. 21A illustrates a cross section in a case where the sensor in Modification 7 is cut along a cutting line XXIA-XXIA, and illustrates a state in which the sensor is bent in different directions. FIG. 21B illustrates a cross section in a case where the sensor in Modification 7 is cut along a cutting line XXIB-XXIB, and illustrates a state in which the sensor is bent in different directions. As illustrated in the figure, the first electrode substrate 50 is divided and the lattice-like groove 70d is further formed in the first dielectric layer 70, whereby the sensor can obtain flexibility. Note that, in FIGS. 21A and 21B, the configuration of the sensor is simplified as appropriate.

Other Modifications

In the above-described embodiments and the like, a side that is not the operation surface side (for example, the second electrode substrate 60) may include a metal plate or the like. Furthermore, in the above-described embodiments and the like, the number of pressure detection units may be one. Furthermore, the first and second electrode substrates may have a configuration having no substrate (a configuration having only the REF electrode layer). The pulse electrodes 42 and the sensor electrodes 43 may be provided on one surface of the substrate 41. The pulse electrodes 42 and the sensor electrodes 43 may individually include a plurality of linear electrodes (also referred to as sub-electrodes), and only the intersections may be formed by the sub-electrodes.

In the above-described embodiments and the like, there is no need to provide the recesses (for example, recesses 75) corresponding to all the protrusions (for example, the protrusions 55). Furthermore, the entire periphery of each of the protrusions does not have to be surrounded by a corresponding one of the recesses. The recesses are not necessarily recesses, and protrusions may be provided in an island shape on the flat first dielectric layer 70, or columns may be provided in a predetermined pattern in the first dielectric layer 70.

In the above-described embodiments, the slide operation has been exemplified as the operation in which the shearing force is generated, but the operation may be operation by a plurality of fingers such as grasping operation or pinching operation.

The configurations, methods, processes, shapes, materials, numerical values, and the like in the embodiments described above are merely examples, and different configurations, methods, processes, shapes, materials, numerical values, and the like may be used as necessary. A configuration may be added for implementing the above-described embodiments and modifications as appropriate. The above-described embodiments and modifications can be combined as appropriate.

The present technology can also adopt the following configurations.

(1)

A sensor including:

a sensing layer including a pressure detection unit;

a dielectric layer provided on the sensing layer, the dielectric layer being deformable; and a conductive layer including a protrusion protruding toward the dielectric layer, the conductive layer being movable in an in-plane direction of the sensing layer.

(2)

The sensor according to (1), in which a tip of the protrusion is rounded.

(3)

The sensor according to (1), in which the protrusion includes a side surface inclined such that a width of the side surface becomes narrower from a bottom toward a top of the protrusion.

(4)

The sensor according to any of (1) to (3), in which the protrusion and the pressure detection unit are provided to correspond to each other.

(5)

The sensor according to any of (1) to (4), in which the protrusion and two or more pressure detection units are provided to correspond to each other.

(6)

The sensor according to any of (1) to (5), in which the protrusion has a dot shape.

(7)

The sensor according to any of (1) to (5), in which the protrusion has a linear shape.

(8)

The sensor according to any of (1) to (7), in which the conductive layer is divided within a plane.

(9)

The sensor according to any of (1) to (8), in which the dielectric layer includes an elastic protrusion protruding toward the conductor layer.

(10)

The sensor according to any of (1) to (9), in which the elastic protrusion is in contact with the conductor layer.

(11)

The sensor according to any of (1) to (9), in which the elastic protrusion is bonded to the conductor layer.

(12)

The sensor according to any of (1) to (11), in which the elastic protrusion has a configuration enabled to change in stages a load applied to the protrusion of the conductor layer at time of movement in the in-plane direction of the conductive layer.

(13)

The sensor according to any of (1) to (12), in which
the sensing layer includes:
a substrate;
a first electrode provided on one surface of the substrate; and
a second electrode provided on another surface of the substrate, and
the pressure detection unit includes the first electrode and the second electrode.

(14)

The sensor according to any of (1) to (12), in which
the sensing layer includes:
a substrate; and
a first electrode and a second electrode provided on one surface of the substrate, and
the pressure detection unit includes the first electrode and the second electrode.

(15)

A sensor including:
a sensing layer including a pressure detection unit;
a first dielectric layer provided on one surface of the sensing layer, the first dielectric layer being deformable;
a first conductive layer provided on a side of the first dielectric layer, the first conductive layer including a first protrusion protruding toward the first dielectric layer, the first dielectric layer being movable in an in-plane direction of the sensing layer;
a second dielectric layer provided on another surface of the sensing layer, the second dielectric layer being deformable; and
a second conductive layer provided on a side of the second dielectric layer.

(16)

The sensor according to (15), in which the second conductive layer includes a second protrusion protruding toward the second dielectric layer and is movable in the in-plane direction of the sensing layer.

(17)

The sensor according to any of (1) to (16), further including a control unit that detects pressing force and shearing force of the conductive layer on the basis of an output from the pressure detection unit.

(18)

An electronic device including the sensor according to any of (1) to (17).

(19)

A wearable terminal including the sensor according to any of (1) to (17), the wearable terminal being enabled to be worn on a human body.

(20)

A control method including:
detecting a change in capacitance of a pressure detection unit depending on pressing force or shearing force, by a detection unit; and
executing processing depending on a detection result of the detection unit, by a control unit.

5. Application Examples

Next, application examples of the present technology will be described, but the present technology is not limited to the application examples below. As application examples, the sensor of the present technology can be applied to a wristwatch type electronic device, a head mounted display, an operation display, an electronic musical instrument, a socks type sensor, a band type electronic device such as a smart band, a bracelet type electronic device, a ring type electronic device, an eyeglass type electronic device, a clothing type electronic device, or the like.

Pressure distribution sensing on the inside of the band 12 may be performed by using the sensor 100. As a result, shapes of a muscle and a tendon can be read, and from a posture of an arm and a posture of a finger, it is possible to estimate what a wearer of the wristwatch type electronic device 10 is currently doing. Furthermore, by consciously moving an arm and a hand, it becomes possible to control the device with only one arm on which the device is worn. Such detection operation is difficult with a general touch sensor, and is an advantage unique to the pressure distribution sensor. There is a method of detecting myoelectricity as a method of sensing movement of an arm, but the myoelectricity has a large noise due to a contact degree of skin, a perspiration situation, and the like. Note that, the above pressure distribution sensing may be performed by the band type electronic device such as the smart band, the bracelet type electronic device, or the like. Furthermore, the sensor 100 may be a so-called biosensor. In this case, the controller IC 22 may detect a heartbeat, a pulse, or the like of the user wearing the wristwatch type electronic device on the basis of the output signal supplied from the sensor 100, and notify the CPU 21 of the detection result.

For example, in a case where the above-described sensor is used on a main body side surface of the head mounted display, even if a field of view is blocked, it is possible to perform cursor operation or the like by pushing and slightly sliding the side surface without requiring an additional controller. In a case where the sensor is used in the main body front surface, it is possible to make a video being viewed correspond to an operation portion, and interactive contents can be implemented.

For example, in a case where the above-described sensor is used on the back surface of the operation display, operations can be distinguished and handled, such that cursor movement is performed by shearing force detection with a change in a pressure detection position, and a page feed or a music feed is performed by shearing force detection without the change in the pressure detection position.

For example, in a case where the above-described sensor is used for the electronic musical instrument, in the case of a keyboard, pressing force and shearing force are detected with the keyboard, whereby expressiveness of a performance can be enhanced. Similarly to the operation display, by distinguishing the presence or absence of the change in the pressure detection position, operations can be performed, for example, by which bending is performed in a case where a finger is slid largely, and vibrato is performed in a case where a finger is shaken on the spot.

In a case where the above-described sensor is used for the socks type sensor, it is possible to detect not only a pressure distribution applied to a sole but also firm standing, or the like. It is therefore possible to perform evaluation of exercise capacity, performance evaluation of shoes, and the like.

For example, in a case where the sensor is used for the outside of a band portion of a bracelet type terminal, it is possible to make a transition of a screen simply by applying force in a plane direction after pushing in. As a result, it does not occur that a narrow screen is blocked by a finger and becomes difficult to be seen as in a case where a touch sensor or the like is mounted on the screen, and operation is possible without any inconvenience even in the band portion having a narrow width. Furthermore, in a case where only the pushing in is accepted as an input, it is possible to determine that pressing force including a slide is caused by contact with clothing or the like, and ignore the pressing force (the pressing force is not processed).

For example, in a case where the sensor is used inside the band portion of the bracelet type terminal, it is possible to detect a contact situation with a wrist by pressure and detect deviation from the wrist by shearing force. Since a contact state with the wrist largely affects measurement precision and accuracy in the case of a terminal mounting a pulse sensor, usage can be implemented such that a warning is issued if the contact state is bad, and if the deviation from the wrist is likely to occur, pulse measurement data at that time is ignored, for example.

When the above-described sensor is used as an input interface of a device, since applying force in a plane direction is added as an operation method other than pressing, contents become abundant by which the device can be instructed. For example, it is possible to distinguish between a case where a finger is slid largely after the pressing and a case where only force is applied in the plane direction without movement. Both cases detect shearing force, but there is a difference that the pressure detection position changes in the former but does not change in the latter. As a result, two or more kinds of operations can be set in the lateral direction. Furthermore, even in a configuration in which the pressure detection units are arranged only in the one-dimensional direction, there is an advantage that the slide operation in the lateral direction can be detected. As a result, it is possible to implement an equivalent input interface without providing input interfaces such as a button, a slider, a wheel, and a joystick on a device surface, so that usability can be improved without impairing the design.

In a case where the above-described sensor is used as the input interface of the device, since it is possible to distinguish between a case where the pressing is vertically performed and a case where the pressing is performed with shearing force, the sensor can be used for discrimination between an intended input and an unintended input. Since shearing force is often generated in a case where an object such as clothing unintentionally comes into contact with and presses the device, for example, by ignoring the shearing force as the unintended input, erroneous detection of the input can be prevented.

When the above-described sensor is used as the pressure distribution sensor, a pressure distribution and shearing force can be measured with one sensor without using a distortion sensor and the like together. The present technology is therefore suitable in a case where the shearing force is useful information in addition to the pressure distribution as in the development of shoes as described above.

Figure 22:
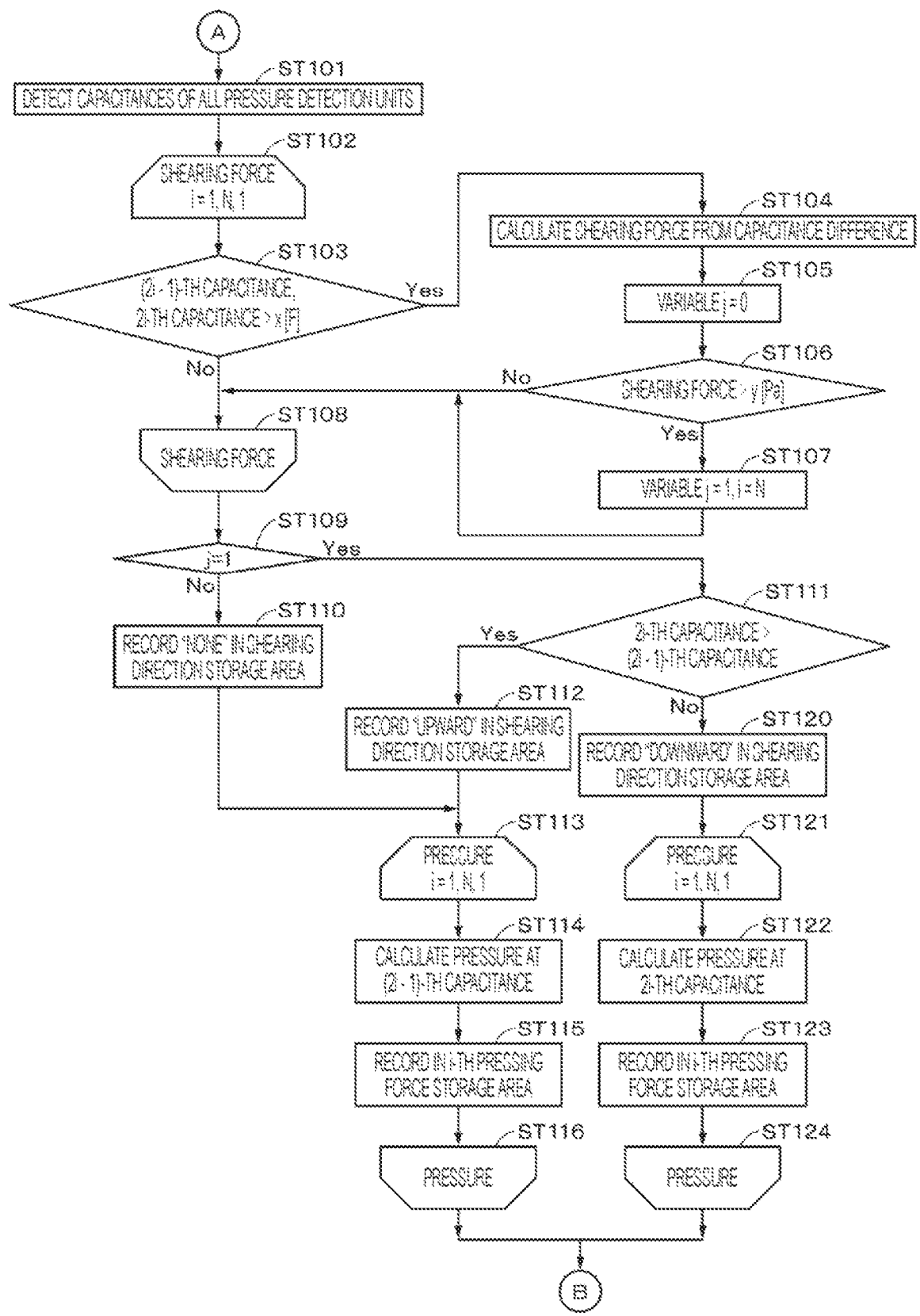
FIG. 22 is a flowchart for explaining a processing example in application examples.
Figure 23:
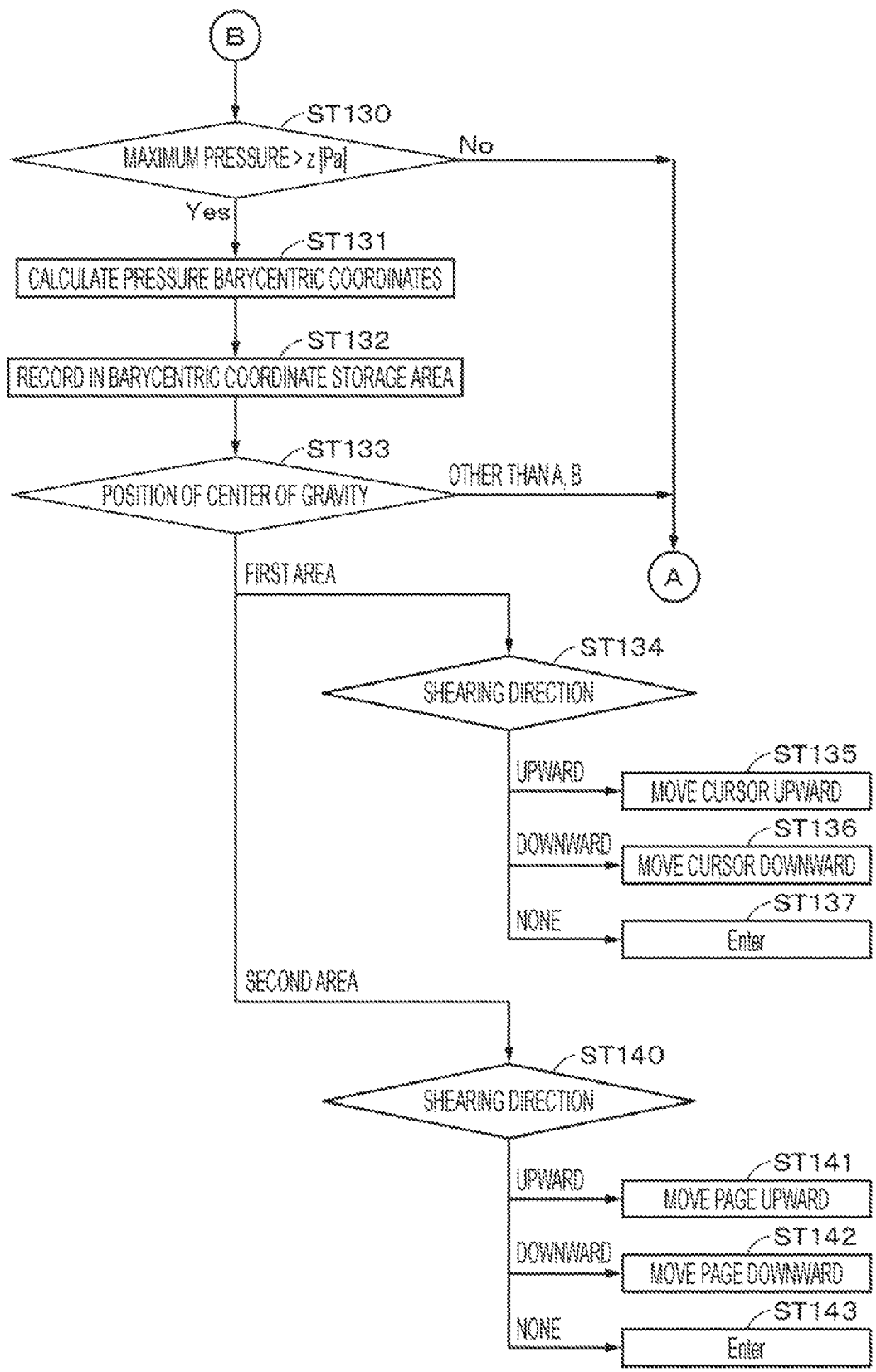
FIG. 23 is a flowchart for explaining the processing example in the application examples.

A processing example in the application examples will be described. A first example is processing of detecting operation on the band 12 of the bracelet type terminal (for example, the wristwatch type electronic device 10 described above) and processing executed depending on the operation. A flow of the processing will be described with reference to flowcharts of FIGS. 22 and 23. The processing described below is performed by the controller IC 22 depending on the detection result by the sensor 100, for example. Note that, "A" and "B" surrounded by circles in FIGS. 22 and 23 are symbols indicating continuity of the processing, and do not mean special processing.

In the following description, it is assumed that two areas (a first area and a second area) are set in the band 12. Two of the pressure detection units 45 are set as one set, and the number of the pressure detection units 45 (the number of nodes) is 2×N. In a memory (for example, a memory included in the controller IC 22), N pressing force storage areas, one shearing direction storage area, and one barycentric coordinate storage area are set, and variables (i, j) are set as variables in the processing.

In step ST101, capacitances are detected of all the pressure detection units. Then, the processing proceeds to step ST102. In step ST102, processing is performed of detecting shearing force. Step ST102 indicates the start of a loop, and each time the loop is repeated, the variable i is incremented from 1 to N in increments of 1. In the processing in step ST103, it is determined whether or not the shearing force is applied and a capacitance difference is generated. Specifically, it is determined whether or not the capacitance difference between the capacitance of the (2i−1)-th pressure detection unit 45 and the capacitance of the 2i-th pressure detection unit 45 is greater than x [F]. In a case where the capacitance difference is greater than x, the processing proceeds to step ST104. If the capacitance difference is less than or equal to x, the processing proceeds to step ST108.

In step ST104, the magnitude of the shearing force (hereinafter simply referred to as the shearing force) is calculated on the basis of the capacitance difference. Then, the processing proceeds to step ST105. In step ST105, the variable j=0 is set. Then, the processing proceeds to step ST106. In step ST106, it is determined whether or not the shearing force is greater than a threshold value. For example, it is determined whether or not the shearing force is greater than y [Pa]. Here, the threshold value y is a threshold value for determining the presence or absence of the shearing force. In a case where the shearing force is greater than y [Pa], the processing proceeds to step ST107. In a case where the shearing force is less than or equal to y, the processing proceeds to step ST108. In step ST107, j=1 and i=N are set.

Step ST108 indicates the end of the processing related to the loop. After all the processing steps related to the loop are ended, the processing proceeds to ST109. In step ST109, it is determined whether or not the variable j is 1. Here, in a case where the variable j is not 1, the processing proceeds to step ST110, and a value (for example, a digital value of a predetermined bit depth) indicating "none" is recorded in the shearing direction storage area of the memory, and then the processing proceeds to step ST113. In a case where j is 1 in step ST109, the processing proceeds to step ST111.

In step ST111, it is determined whether or not the shearing force is applied to a side of a node of a lower number. For example, it is determined whether or not the 2i-th capacitance is greater than the (2i−1)-th capacitance. In a case where the result of step ST111 is Yes, the processing proceeds to step ST112. In step ST112, a value (for example, a digital value of a predetermined bit depth) indicating "upward" is recorded in the shearing direction storage area, and then the processing proceeds to step ST113.

In step ST113, a loop of pressure detection is started. In step ST114, the pressure is calculated at a node in which the capacitance is further decreased, in other words, the (2i−1)-th node. Then, the processing proceeds to step ST115. In step ST115, the result of step ST114 is recorded in the i-th pressing force storage area. Step ST116 indicates the end of the processing related to the loop.

In a case where the result of step ST111 is No, the processing proceeds to step ST120. In step ST120, a value (for example, a digital value of a predetermined bit depth) indicating "downward" is recorded in the shearing direction storage area, and then the processing proceeds to step ST121.

In step ST121, a loop of pressure detection is started. In step ST122, the pressure is calculated at a node in which the capacitance is further decreased, in other words, the 2i-th node. Then, the processing proceeds to step ST123. In step ST123, the result of step ST122 is recorded in the i-th pressing force storage area. Step ST124 indicates the end of the processing related to the loop.

After the processing related to the loop is ended in step ST116 or step ST124, the processing transitions to step ST130 illustrated in FIG. 23. In step ST130, it is determined whether or not the maximum pressure stored in the pressing force storage area is greater than a threshold value z [Pa]. If the maximum pressure exceeds the threshold value, the sensor is pressed. In a case where the determination in step ST130 is Yes, the processing proceeds to step ST131.

In step ST131, pressure barycentric coordinates are calculated on the basis of the position of the node. Then, the processing proceeds to step ST132. In step ST132, the pressure barycentric coordinates are recorded in the barycentric coordinate storage area. Then, the processing proceeds to step ST133. In step ST133, the position of the center of gravity is determined. Here, in a case where the position of the center of gravity is in a position other than the first and second areas that are operation areas, the processing returns to the processing of step ST101 illustrated in FIG. 22. In a case where the position of the center of gravity is in the first area that is the operation area, the processing proceeds to step ST134, and in a case where the position of the center of gravity is in the second area that is the operation area, the processing proceeds to step ST140.

In step ST134, a shearing direction is determined, and processing is performed depending on the shearing direction. For example, in a case where the shearing direction is upward, processing of moving the cursor upward is performed in step ST135. In a case where the shearing direction is downward, processing of moving the cursor downward is performed in step ST136. In a case where there is no shearing force, entering (decision input) is performed in step ST136, and processing corresponding thereto is performed.

Similarly, as for operation in the second area, in step ST140, a shearing direction is determined, and processing is performed depending on the shearing direction. For example, in a case where the shearing direction is upward, processing of moving the cursor upward is performed in step ST141. In a case where the shearing direction is downward, processing of moving the cursor downward is performed in step ST142. In a case where there is no shearing force, entering (decision input) is performed in step ST143, and processing corresponding thereto is performed.

Next, with reference to the flowcharts of FIGS. 24 and 25, a flow will be described of processing of detecting deviation of the band of a bracelet type terminal (for example, the wristwatch type electronic device 10 described above) and processing executed depending on the detection result. The processing described below is performed by the controller IC 22 depending on the detection result by the sensor 100, for example. Note that, "C" and "D" surrounded by circles in FIGS. 24 and 25 are symbols indicating continuity of the processing, and do not mean special processing.

In the following description, two of the pressure detection units 45 are set as one set, and the number of the pressure detection units 45 (the number of nodes) is N. In the memory (for example, the memory included in the controller IC 22), N state storage areas are set, and variables (i, j, k) are set as variables in the processing.

Figure 24:
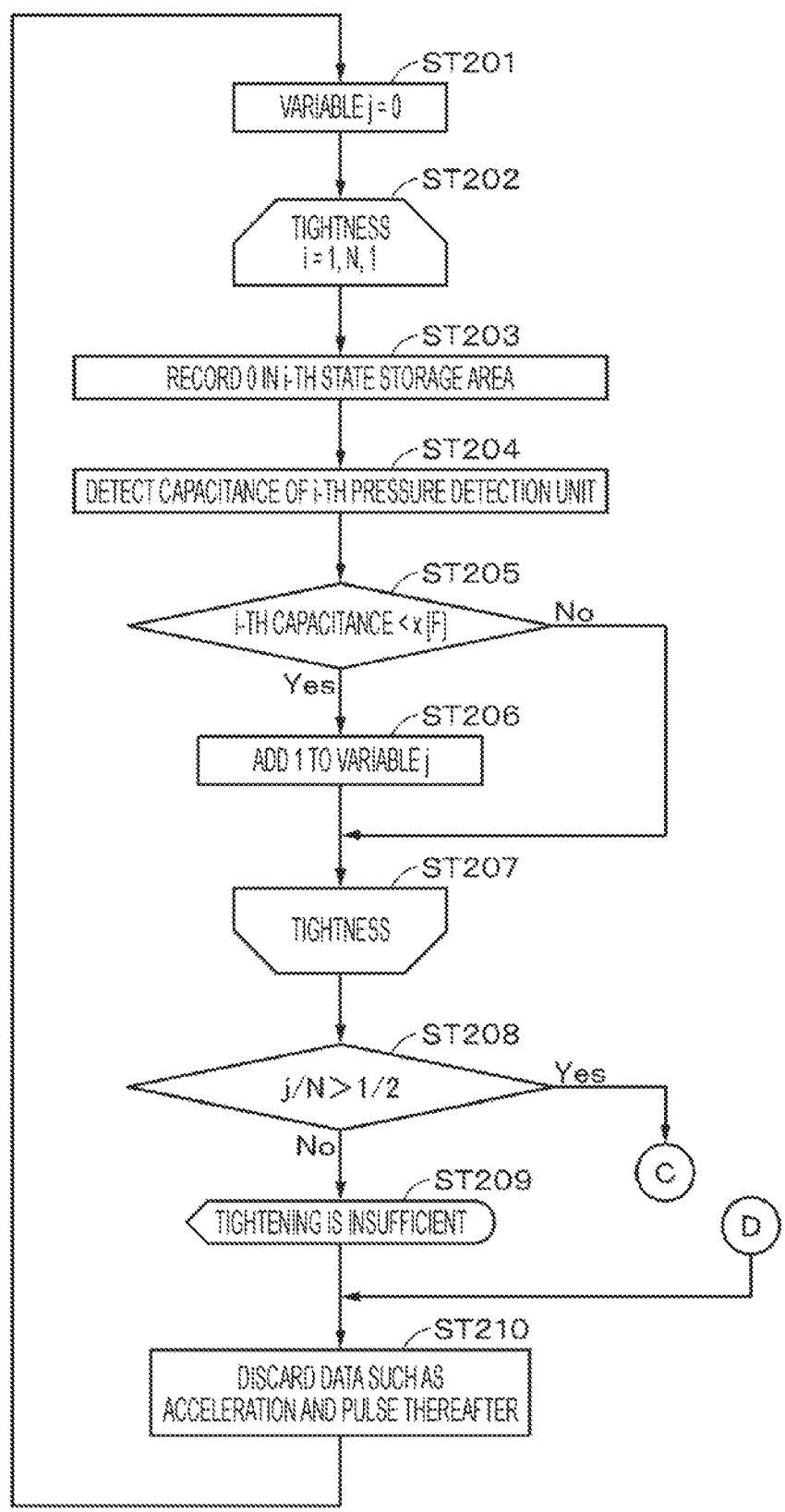
FIG. 24 is a flowchart for explaining another processing example in the application examples.
Figure 25:
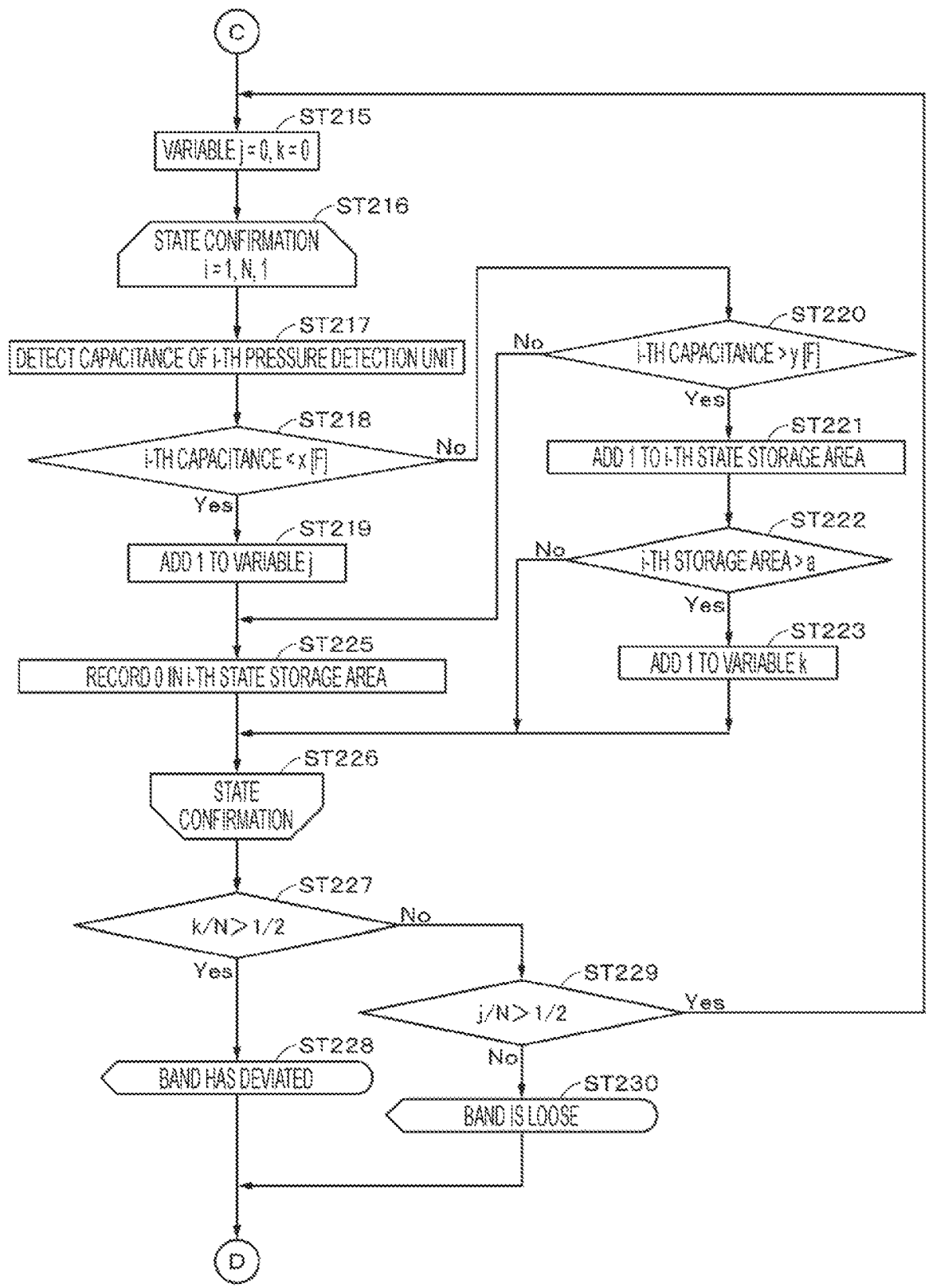
FIG. 25 is a flowchart for explaining the other processing example in the application examples.

In the flowchart of FIG. 24, in step ST201, the variable j=0 is set. Then, the processing proceeds to step ST202. In step ST202, a loop of determining tightness of the belt is started. Each time the loop is repeated, the variable i is incremented from 1 to N in increments of 1. Then, the processing proceeds to step ST203.

In step ST203, 0 is recorded in the i-th state storage area. Then, the processing proceeds to step ST204. In step ST204, the capacitance of the i-th pressure detection unit 45 is detected. Then, the processing proceeds to step ST205. In step ST205, it is determined whether or not the pressure due to tightening the belt exceeds a threshold value, specifically, whether or not the capacitance of the i-th pressure detection unit 45 is less than x [F]. If the result of step ST205 is Yes, the processing proceeds to step ST206, and 1 is added to the variable j. In other words, the variable j in this example indicates the number of nodes in which the pressure exceeds the threshold value. After 1 is added to the variable j, the processing proceeds to step ST207. Furthermore, if the result of step ST205 is No, the processing proceeds to step ST207. Step ST207 indicates the end of the processing related to the loop.

After the processing related to the loop is ended, the processing proceeds to step ST208. In step ST208, it is determined whether or not j/N is greater than ½, specifically, whether or not sufficient pressure is applied to more than half of the nodes. Here, if the determination in step ST208 is No, the processing proceeds to step ST209.

In step ST209, since the sufficient pressure is not applied to a certain number or more of the nodes (for example, more than half), for example, "tightening is insufficient" or the like is displayed. In a case where tightening of the belt is insufficient, there is a possibility that accurate measurement cannot be performed. For that reason, in the processing of step ST210 following step ST209, data are discarded such as acceleration and pulse to be obtained thereafter. Note that, specific processing contents in step ST210 can be changed depending on applications.

If the determination in step ST208 is Yes, the processing proceeds to step ST215 in FIG. 25. In step ST215, the variables j=0 and k=0 are set. Then, the processing proceeds to step ST216. Step ST216 indicates the start of a looping processing for state confirmation.

In step ST217, the capacitance of the i-th pressure detection unit 45 is detected. Then, the processing proceeds to step ST218. In step ST218, it is determined whether or not the capacitance of the i-th pressure detection unit 45 is less than x [F]. If the result of step ST218 is Yes, the processing proceeds to step ST219, and 1 is added to the variable j. In step ST225 following step ST219, 0 is recorded in the i-th state storage area, and the processing proceeds to step ST226. Step ST226 indicates the end of the processing related to the loop.

If the result of step ST218 is No, the processing proceeds to step ST220. In step ST220, it is determined whether or not the capacitance of the i-th pressure detection unit 45 is greater than y [F]. Here, the threshold value y is a threshold value for determining the presence or absence of the shearing force. If the determination result of step ST220 is No, the processing proceeds to step ST225 described above. If the determination result of step ST220 is Yes, the processing proceeds to step ST221.

In step ST221, processing is performed of adding (addition) 1 to the i-th state storage area. Then, the processing proceeds to step ST222. In step ST222, it is determined whether or not the i-th storage area has exceeded a threshold value "a". This determination is processing of determining whether or not exceeding of the shearing force has occurred a number of times "a" in succession. If the determination result of step ST222 is No, the processing proceeds to step ST226. If the determination result of step ST222 is Yes, the processing proceeds to step ST223. In step ST223, 1 is added to the variable k, and thereafter, the processing proceeds to step ST226.

After the processing related to the loop is ended, the processing proceeds to step ST227. In step ST227, it is determined whether or not k/N is greater than ½. In other words, it is determined whether or not half of the nodes continue to exceed the threshold value. If the result of step ST227 is Yes, the processing proceeds to step ST228. In step ST228, since the shearing force is continuously applied to more than half of the nodes, for example, "band has deviated" or the like is displayed. After the processing of step ST228, the processing transitions to the processing of step ST210 in the flowchart of FIG. 24.

If the result of step ST227 is No, the processing proceeds to step ST229. In step ST229, it is determined whether or not j/N is greater than ½. In other words, it is determined whether or not sufficient pressure is applied to half of the nodes. If the determination result of step ST229 is Yes, the processing returns to step ST215. If the determination result of step ST229 is No, the processing proceeds to step ST230. In step ST230, since the sufficient pressure is not applied to more than half of the nodes, for example, "band is loose" or the like is displayed. After the processing of step ST230, the processing transitions to the processing of step ST210 in the flowchart of FIG. 24. Although the processing example in the application examples has been described above, it goes without saying that the processing described above can be changed as appropriate depending on application fields of the sensor.

REFERENCE SIGNS LIST

10 Electronic device
40 Sensing layer
45 Pressure detection unit
50 First electrode substrate
50*b* First REF electrode layer
55 Protrusion
60 Second electrode substrate
60*b* First REF electrode layer
70 First dielectric layer
75 Recess
76 Elastic protrusion
80 Second dielectric layer
100 Sensor

The invention claimed is:

1. A sensor, comprising:
a sensing layer including a pressure detection unit;
a dielectric layer on the sensing layer, wherein the dielectric layer is deformable; and
a conductive layer including a protrusion protruding toward the dielectric layer, wherein the conductive layer is movable in an in-plane direction of the sensing layer.

2. The sensor according to claim 1, wherein a tip of the protrusion is rounded.

3. The sensor according to claim 1, wherein
the protrusion includes an inclined side surface, and
a width of the inclined side surface becomes narrower from a bottom of the protrusion toward a top of the protrusion.

4. The sensor according to claim 1, wherein the protrusion and the pressure detection unit correspond to each other.

5. The sensor according to claim 1, wherein the protrusion and two or more pressure detection units correspond to each other.

6. The sensor according to claim 1, wherein the protrusion has a dot shape.

7. The sensor according to claim 1, wherein the protrusion has a linear shape.

8. The sensor according to claim 1, wherein the conductive layer is divided within a plane.

9. The sensor according to claim 1, wherein the dielectric layer includes an elastic protrusion protruding toward the conductive layer.

10. The sensor according to claim 9, wherein the elastic protrusion is in contact with the conductive layer.

11. The sensor according to claim 9, wherein the elastic protrusion is bonded to the conductive layer.

12. The sensor according to claim 9, wherein a load applied to the protrusion of the conductive layer at time of movement of the conductive layer in the in-plane direction of the conductive layer is changeable in stages based on the elastic protrusion.

13. The sensor according to claim 1, wherein
the sensing layer further includes:
a substrate;
a first electrode on a first surface of the substrate; and a second electrode provided on a second surface of the substrate, and
the pressure detection unit includes the first electrode and the second electrode.

14. The sensor according to claim 1, wherein
the sensing layer further includes:
a substrate; and
a first electrode and a second electrode on a first surface of the substrate, and
the pressure detection unit includes the first electrode and the second electrode.

15. The sensor according to claim 1, further comprising a control unit configured to detect a pressing force and a shearing force of the conductive layer based on an output from the pressure detection unit.

16. A sensor, comprising:
a sensing layer including a pressure detection unit;
a first dielectric layer on a first surface of the sensing layer, wherein the first dielectric layer is deformable;
a first conductive layer on a side of the first dielectric layer, wherein
the first conductive layer includes a first protrusion protruding toward the first dielectric layer,
the first dielectric layer is movable in an in-plane direction of the sensing layer;
a second dielectric layer on a second surface of the sensing layer, wherein the second dielectric layer is deformable; and
a second conductive layer on a side of the second dielectric layer.

17. The sensor according to claim 16, wherein
the second conductive layer includes a second protrusion protruding toward the second dielectric layer, and
the second conductive layer is movable in the in-plane direction of the sensing layer.

18. An electronic device, comprising:
a sensor, wherein the sensor comprises:
a sensing layer including a pressure detection unit;
a dielectric layer on the sensing layer, wherein the dielectric layer is deformable; and
a conductive layer including a protrusion protruding toward the dielectric layer, wherein the conductive layer is movable in an in-plane direction of the sensing layer.

19. A wearable terminal, comprising:
a sensor, wherein the sensor comprises:
a sensing layer including a pressure detection unit;
a dielectric layer on the sensing layer, wherein the dielectric layer is deformable; and
a conductive layer including a protrusion protruding toward the dielectric layer, wherein the conductive layer is movable in an in-plane direction of the sensing layer,
wherein the wearable terminal wearable on a human body.

20. A control method, comprising:
detecting, by a detection unit, a change in capacitance of a pressure detection unit based on a pressing force or a shearing force; and
determining, by a control unit, a direction of the pressing force or the shearing force based on a node at which the change in the capacitance is detected;
determining, by the control unit, a position of application of the pressing force or the shearing force based on a position of the node at which the change in the capacitance is detected;
executing, by the control unit, a first processing based on the determined position of application of the pressing force or the shearing force that is within a first operating area of an electronic device; and
executing, by the control unit, a second processing based on the determined position of application of the pressing force or the shearing force that is within a second operating area of the electronic device, wherein the first operating area and the second operating area are different.

* * * * *